US007829847B2

(12) United States Patent
Chiarot et al.

(10) Patent No.: US 7,829,847 B2
(45) Date of Patent: Nov. 9, 2010

(54) ELECTROSPRAY EMITTER AND METHOD OF USING SAME

(76) Inventors: Paul Rudolph Chiarot, 70 Spadina Road, Apt. 1002, Toronto, ON (CA) M5R 2T6; Sergey I. Gubarenko, #910-2121 Lake Shore Blvd., West, Toronto, ON (CA) M8V 4E9; Ridha Ben Mrad, 78 Fortune Crescent, Richmond Hill, ON (CA) L4S 1T5; Pierre Edward Sullivan, 19 Silvergrove Road, North York, ON (CA) M2L 2N5

( * ) Notice: Subject to any disclaimer, the term of this patent is extended or adjusted under 35 U.S.C. 154(b) by 345 days.

(21) Appl. No.: 12/155,114

(22) Filed: May 29, 2008

(65) Prior Publication Data

US 2009/0045333 A1 Feb. 19, 2009

Related U.S. Application Data

(60) Provisional application No. 60/924,725, filed on May 29, 2007.

(51) Int. Cl.
*H01J 49/00* (2006.01)
*B01D 59/44* (2006.01)

(52) U.S. Cl. ....................... 250/288; 250/281; 250/282; 250/423 R; 250/424

(58) Field of Classification Search ................. 250/288, 250/281, 282, 423 R, 424
See application file for complete search history.

(56) References Cited

U.S. PATENT DOCUMENTS

| | | | | |
|---|---|---|---|---|
| 6,828,550 | B2 * | 12/2004 | Griffey et al. | 250/281 |
| 6,987,263 | B2 * | 1/2006 | Hobbs et al. | 250/288 |
| 7,388,197 | B2 * | 6/2008 | McLean et al. | 250/293 |

* cited by examiner

*Primary Examiner*—Nikita Wells

(57) ABSTRACT

The present invention relates to electrospray emitters that have a rigid substrate layer, a second layer, a channel formed in one of the rigid substrate layer and an exit orifice in flow communication with the channel. The second layer is attached to the first layer. The exit orifice is capable of holding an electric charge. The electrospray emitter may be used with such devices as a mass spectrometer, a colloidal thruster or an ion mobility device. Additionally, it may be used to coat a surface.

46 Claims, 24 Drawing Sheets

ELECTROSPRAY EMITTER AND METHOD OF USING SAME

CROSS REFERENCE TO RELATED PATENT APPLICATION

This patent application relates to U.S. Provisional Patent Application Ser. No. 60/924,725 filed on May 29, 2007 entitled ELECTROSPRAY EMITTER AND METHOD OF USING SAME which is incorporated herein by reference in its entirety.

FIELD OF THE INVENTION

This invention relates to emitters and in particular electrospray emitters that are useable on a micro scale. The electrospray emitter of the present invention is for use with mass spectrometers, coating systems, colloidal thruster systems, ion mobility spectrometers and the like.

BACKGROUND OF THE INVENTION

The behavior of fluid-air interfaces in a strong electric field has been of interest since Zeleny first observed the deformation of a liquid interface under the influence of a large applied voltage. He reported the formation of a cone with a fine thread of liquid coming from the apex and the disintegration of the thread into small droplets after a short distance. Taylor in 1964 was the first to propose a concise analytical model for the formation and structure of this electrified cone, and it is to him the name 'Taylor Cone' is attributed. When Taylor applied a field on the order of thousands of volts normal to the surface of the liquid, he also observed the formation of a conical liquid interface where a narrow jet of liquid droplets was emitted from the apex. This phenomenon has since become referred to as 'electrospray'.

Using a cone as the equilibrium shape, Taylor recognized that both surface tension and electric stress must vary with the inverse of the radius of the cone. Using the potential for a cone as determined by Hall, Taylor reported an equilibrium expression for the electrified cone and calculated only one possible angle where equilibrium exists.

Sujatha et al. later approached the equilibrium of an electrified interface using the variational principle. Their paper was critical of Taylor's equilibrium model, noting that the excess pressure term is omitted in his formulation. Sujatha et al. found that there was no cone of any angle that satisfied their equilibrium expressions.

Deviations between measured cone angles and Taylor's predicted angle are addressed by Fernandez de la Mora, who accounts for the space charge in the emitted jet when predicting the shape of the interface. Fernandez de la Mora and Loscertales and Ganan-Calvo et al. report a study of the spray current and emitted droplet size of a conical electrified interface, and introduced scaling laws to predict these two quantities. Cloupeau and Prunet-Foch investigated different spraying modes (interface shapes) of a charged interface and Suvorov and Zubarev studied the evolution of Taylor cone formation for a liquid metal ion source. The latter predicted that the free surface approaches a conical shape with a semi-angle nearly identical to that calculated by Taylor.

Understanding the equilibrium of an electrified interface and the conditions required for: 1) the onset of an electrospray and 2) maintaining a steady electrospray once it is formed have important applications in a number of areas. Most notably, the use of electrospray revolutionized the field of mass spectrometry; a result of the seminal work presented by Fenn et al. Other applications of electrosprays include formation of thin films and colloid thrusters for propulsion.

Accordingly, it would advantageous to provide an electrospray emitter that can be easily manufactured and easily used. Further it would be advantageous to provide an electrospray emitter that can be used in the field to collect samples.

SUMMARY OF THE INVENTION

The present invention relates to electrospray emitters that have a rigid substrate layer, a second layer, a channel formed in at least one of the rigid substrate layer the second layer, and an exit orifice in flow communication with the channel. The second layer is attached to the first layer. The exit orifice is capable of holding an electric charge.

In another aspect of the invention there is provided an ion mobility spectrometer. The ion mobility spectrometer includes a first and a second spaced apart ion mobility substrate, at least two spacers, a gate electrode, a field electrode and a detection electrode. The spacers are positioned between the first and second ion mobility substrates whereby the first and second ion mobility substrates and two of the at least two spacers define a drift chamber having an entrance and an exit. The gate electrode is positioned at the entrance of the drift chamber. The field electrode is positioned in the drift chamber, downstream of the gate electrode. The detection electrode is positioned in the drift chamber, downstream of the electrode.

In a further aspect of the invention there is provided a method of creating an electrospray using an electrospray emitter having a fluid channel, an exit orifice in flow communication with the fluid channel, a counter electrode spaced from the exit orifice and whereby there is exit orifice is capable of holding and electric charge and the exit orifice is capable of containing fluid with the perimeter of the orifice, comprising the steps of: applying a pressure to the exit orifice in a predetermined range; applying a pressure and maintaining the pressure to the fluid channel in a predetermined range; applying voltage in a predetermined range between the exit orifice and the counter electrode; and determining a separation distance between the exit orifice and the counter electrode in a predetermined range.

Further features of the invention will be described or will become apparent in the course of the following detailed description.

BRIEF DESCRIPTION OF THE DRAWINGS

The invention will now be described by way of example only, with reference to the accompanying drawings, in which.

DETAILED DESCRIPTION OF THE INVENTION

The microscale electrospray emitter of the present invention is fabricated and used to investigate an electrified air-fluid interface and the formation of quasi equilibrium states (i.e. electrospray). The emitter is designed to be compatible with traditional microfluidic device fabrication and is demonstrated to be compatible with on-chip sample processing. This design is less complicated to fabricate compared to other proposed concepts, and the fact that it is a closed system means it is less susceptible to solvent evaporation and channel contamination compared to other open channel emitters.

Figure 1:
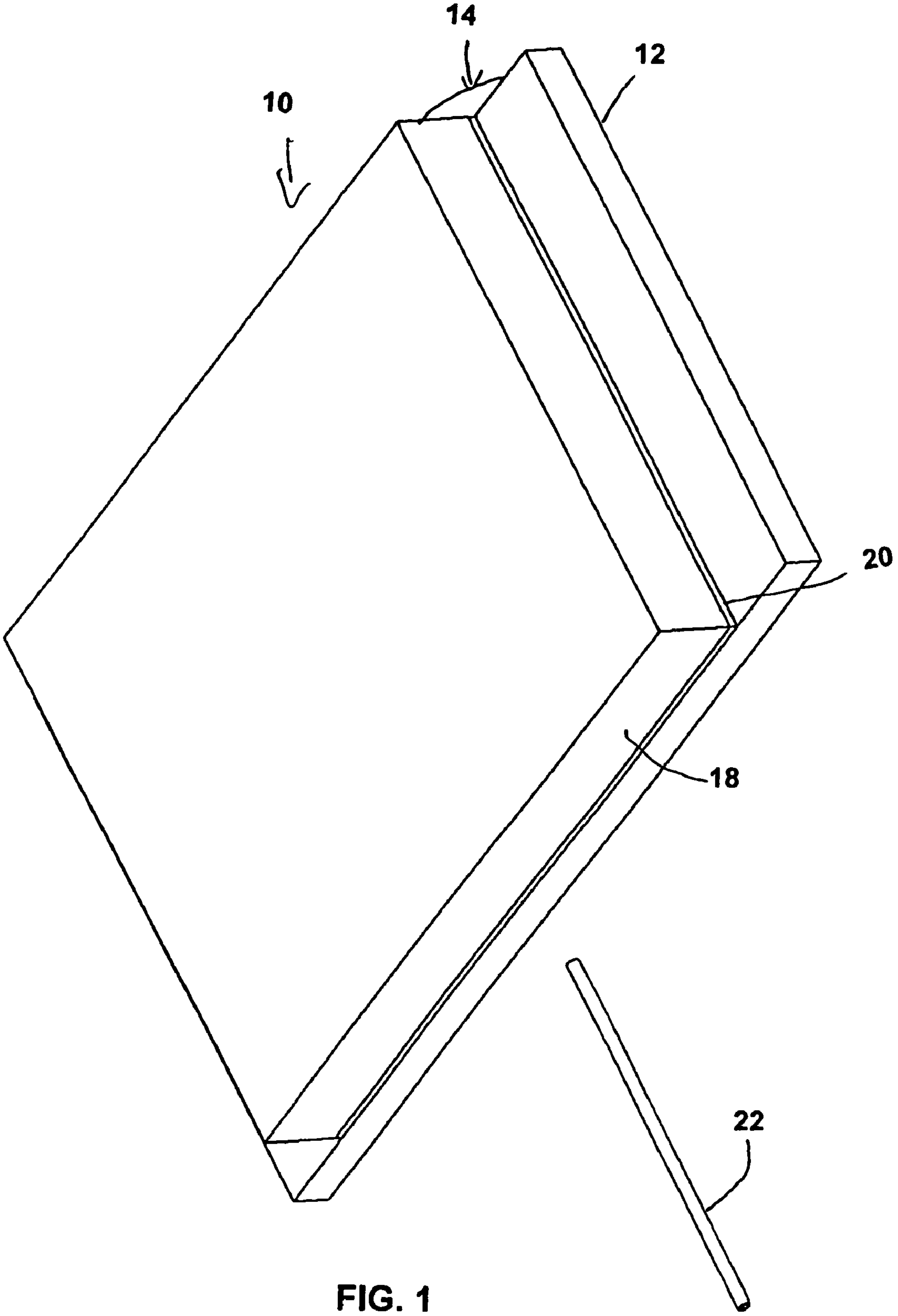
FIG. 1 is a perspective view of an embodiment of the electrospray emitter constructed in accordance with the invention.
Figure 2:
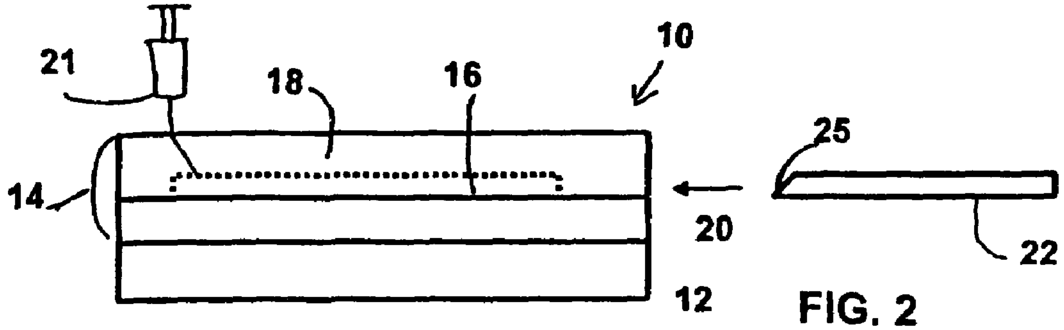
FIG. 2 is a cross sectional view of the electrospray emitter of FIG. 1.

Referring to FIGS. 1 to 5 one embodiment of the electrospray emitter of the present invention is shown generally at 10. Electrospray emitter 10 includes a rigid substrate layer 12 and a second layer 14. A channel 16 (as best seen in FIG. 2) is formed in at least one of the rigid substrate 12 and the second layer 14. An exit orifice is in flow communication with the channel, is capable of holding an electric charge, and is capable of containing fluid within the perimeter of the orifice. Preferably the fluid held at the orifice is at a high electric potential (relative to the counter electrode) in order to form the electrospray. The orifice is in flow communication with the channel so that fluid is continually supplied to the orifice, thus allowing for a stable spray. The fluid is held within the perimeter of the orifice so that it is available for spraying. If it was to spread out and away from the orifice, the lack of fluid would lead to an unstable spray or no spray at all.

Figure 3:
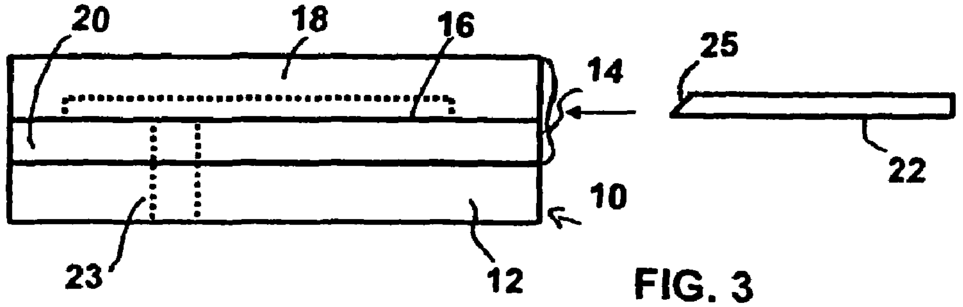
FIG. 3 is a cross section view of an electrospray emitter similar to that shown in FIGS. 1 and 2 but showing a fluid inlet.
Figure 4:
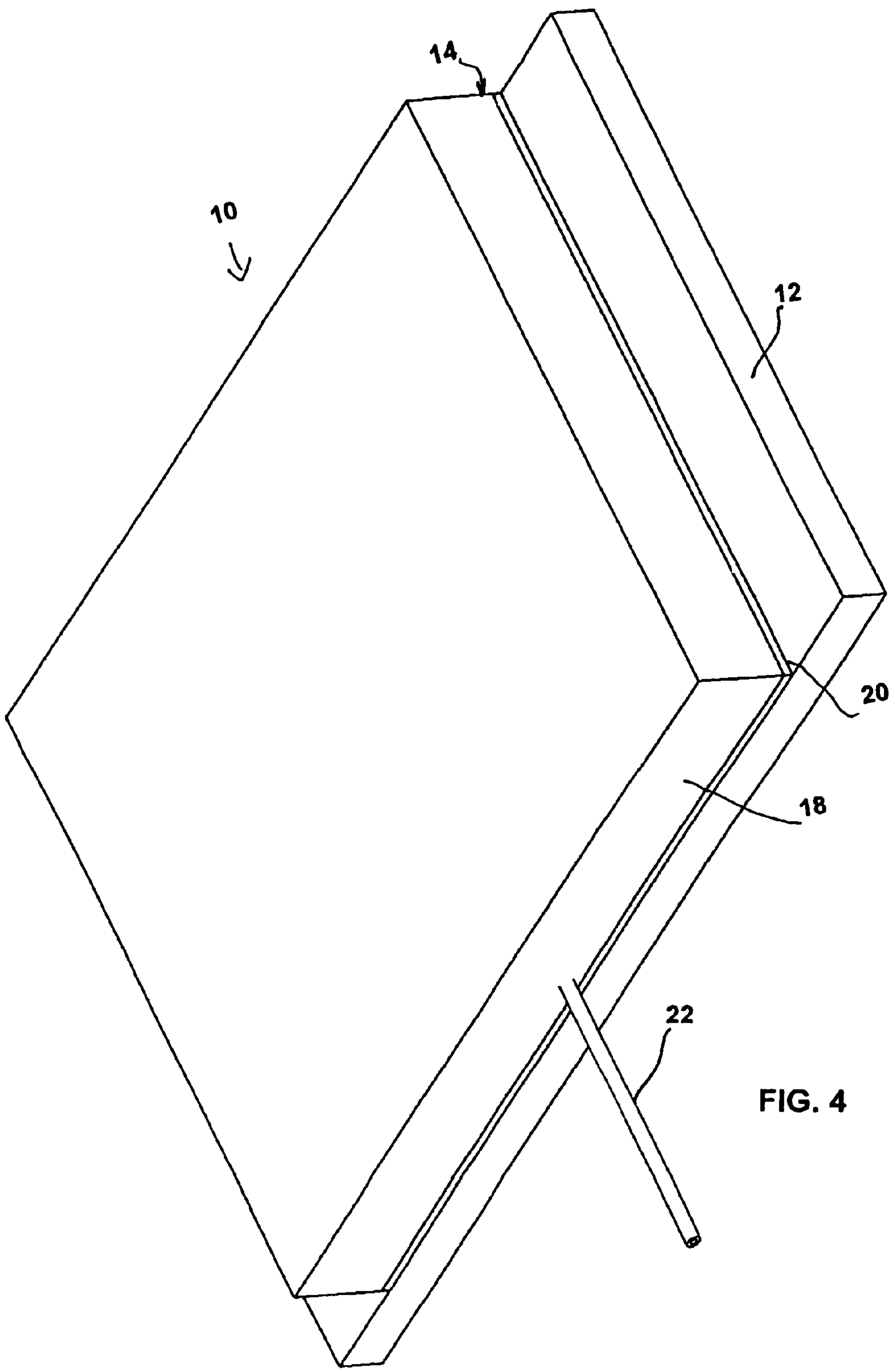
FIG. 4 is a perspective view of an embodiment of the electrospray emitter similar to that shown in FIG. 1 but showing the tube inserted therein.
Figure 5:
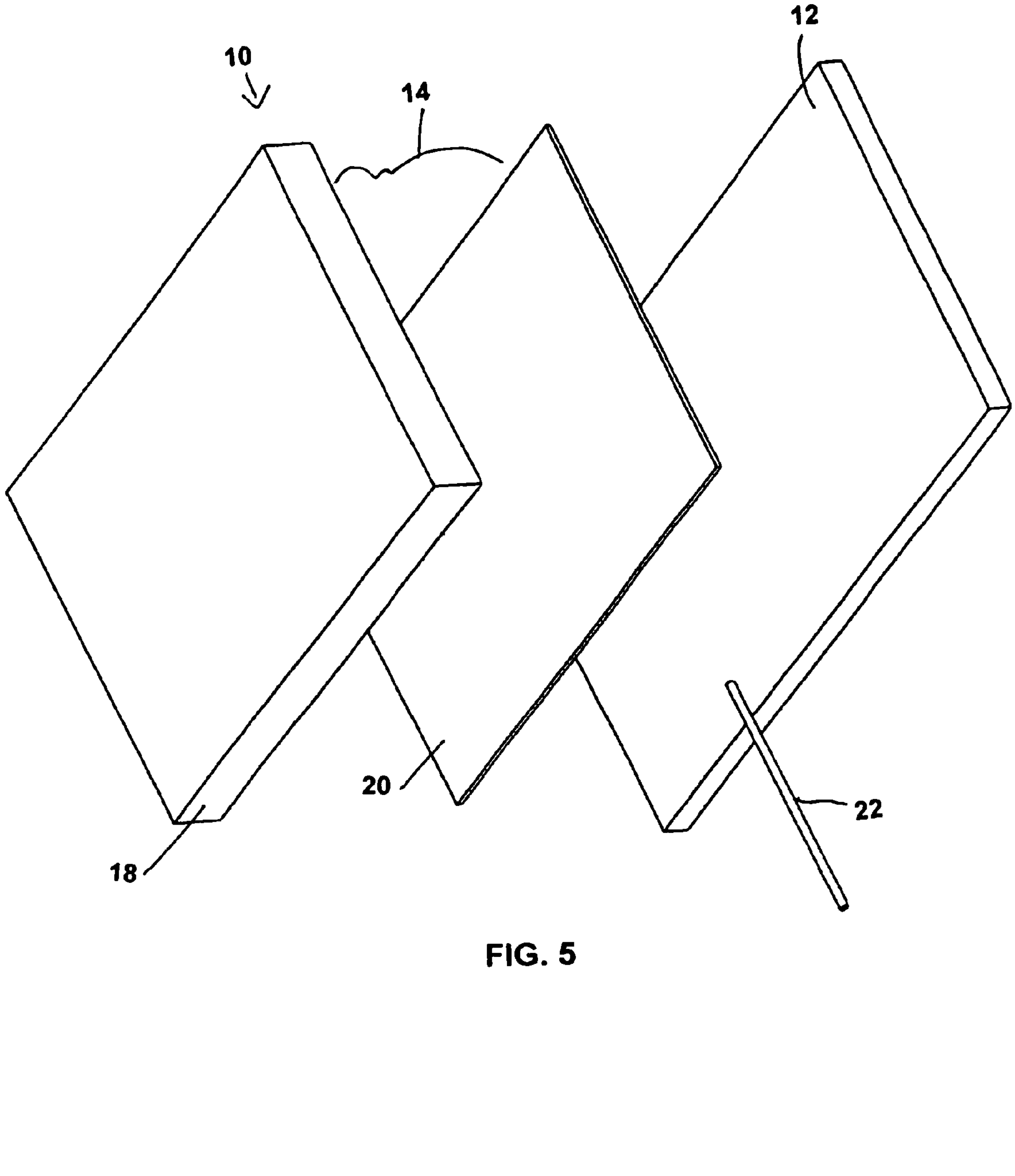
FIG. 5 is a blown apart perspective view perspective view of the embodiment of FIG. 1.

In the embodiment shown in FIGS. 1 to 5 the second layer 14 is comprised of a top layer 18 and an intermediate layer 20. The top layer 18 and intermediate layers 20 are preferably made of Polydimethylsiloxane (PDMS) and the rigid substrate layer is made of glass. Preferably the channel 16 is formed in the top layer 18. Metal tubing 22 is inserted between the top layer 18 and the intermediate layer 20. The electrospray is formed from the end of metal tubing 22 that is inserted into the PDMS at the end of an upstream channel network. Referring to FIG. 3, the fluid inlet 23 may be extended from the outside through to the channel 16. It will be appreciated by those skilled in the art that the fluid inlet 23 may extend through the rigid substrate 12 and intermediate layer 20 into the channel 16 as shown herein or through top layer 18 into the channel 16 (not shown). In this embodiment, the intermediate layer 20 is situated between the rigid substrate layer 12 and the channel 16 and is used to facilitate the positioning of metal tubing 22 and to prevent leakage.

It will be appreciated by those skilled in the art that there are many uses for the electrospray emitter of the present invention. The emitter 10 may be taken into the field to collect samples that are thereafter tested. Specifically, the emitter shown in FIGS. 1 and 2 may be taken to the field prior to inserting the metal tubing 22 and a sample may be injected into the channel 18 via a syringe 21.

Figure 6:
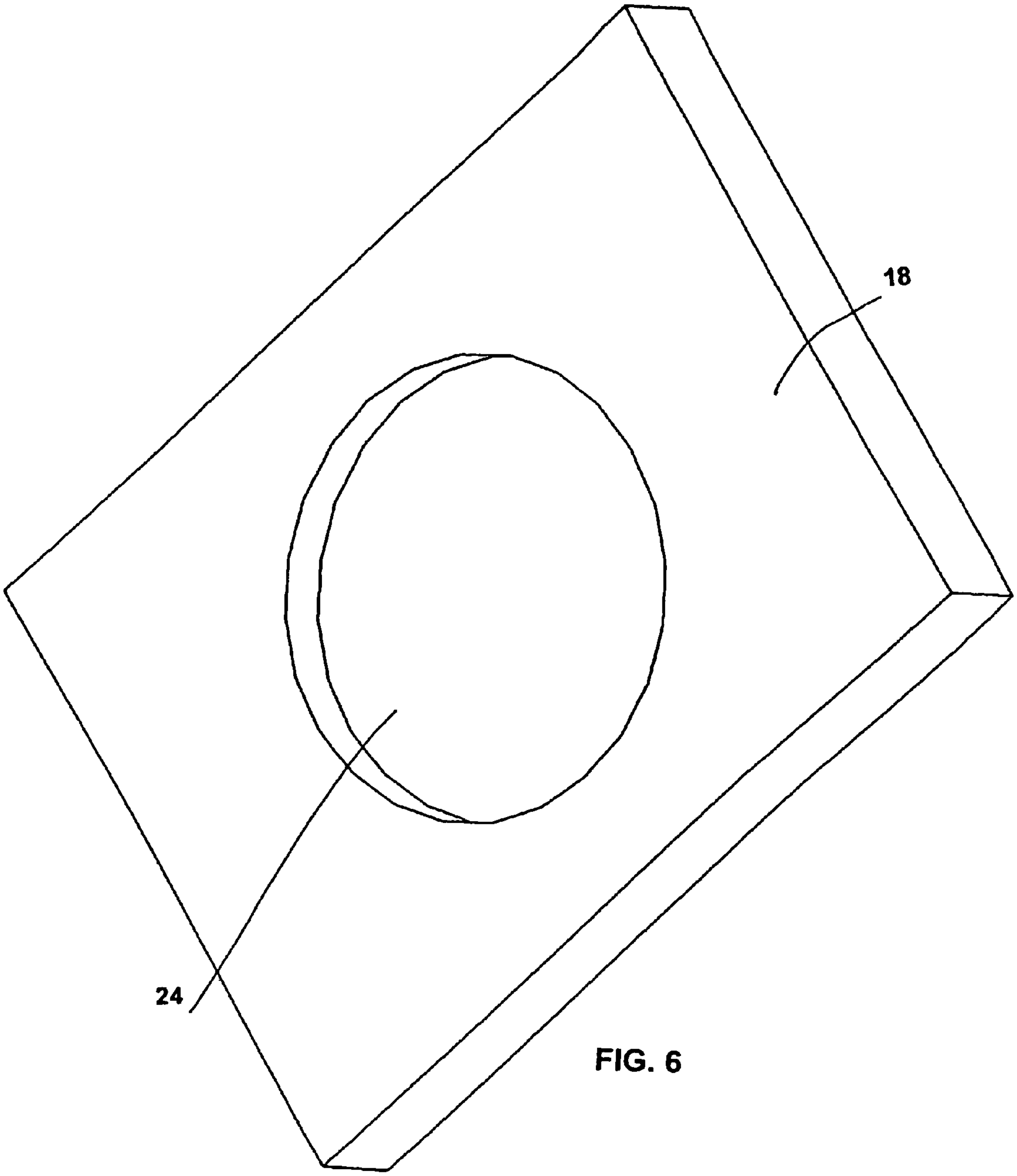
FIG. 6 is a perspective view of a second layer of the electrospray emitter of FIG. 1 as viewed from the inside of the layer and showing one central reservoir.
Figure 7:
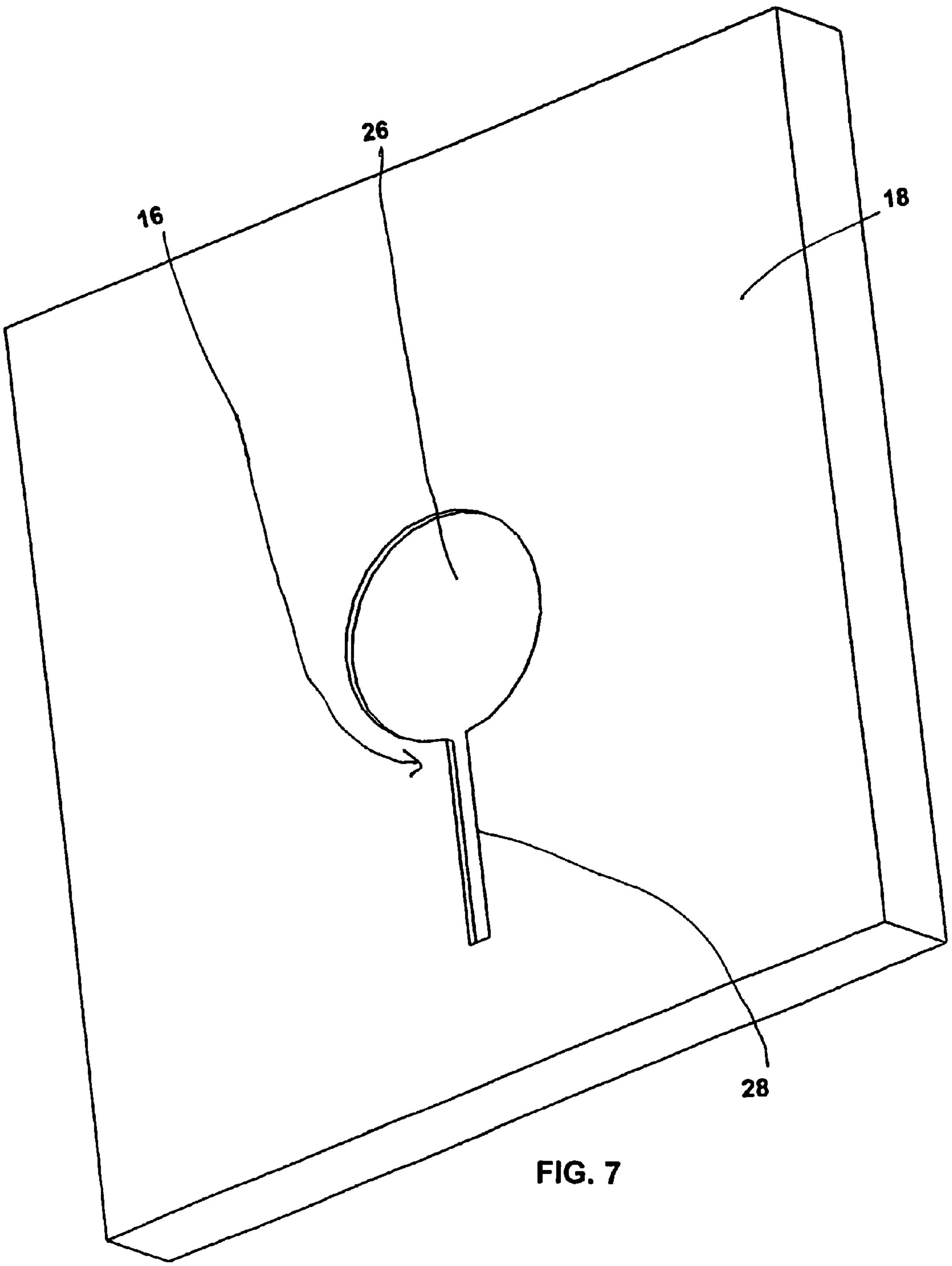
FIG. 7 is a perspective view of an alternate second layer of the electrospray emitter as viewed from the inside of the layer and showing a smaller reservoir with a generally straight channel.
Figure 8:
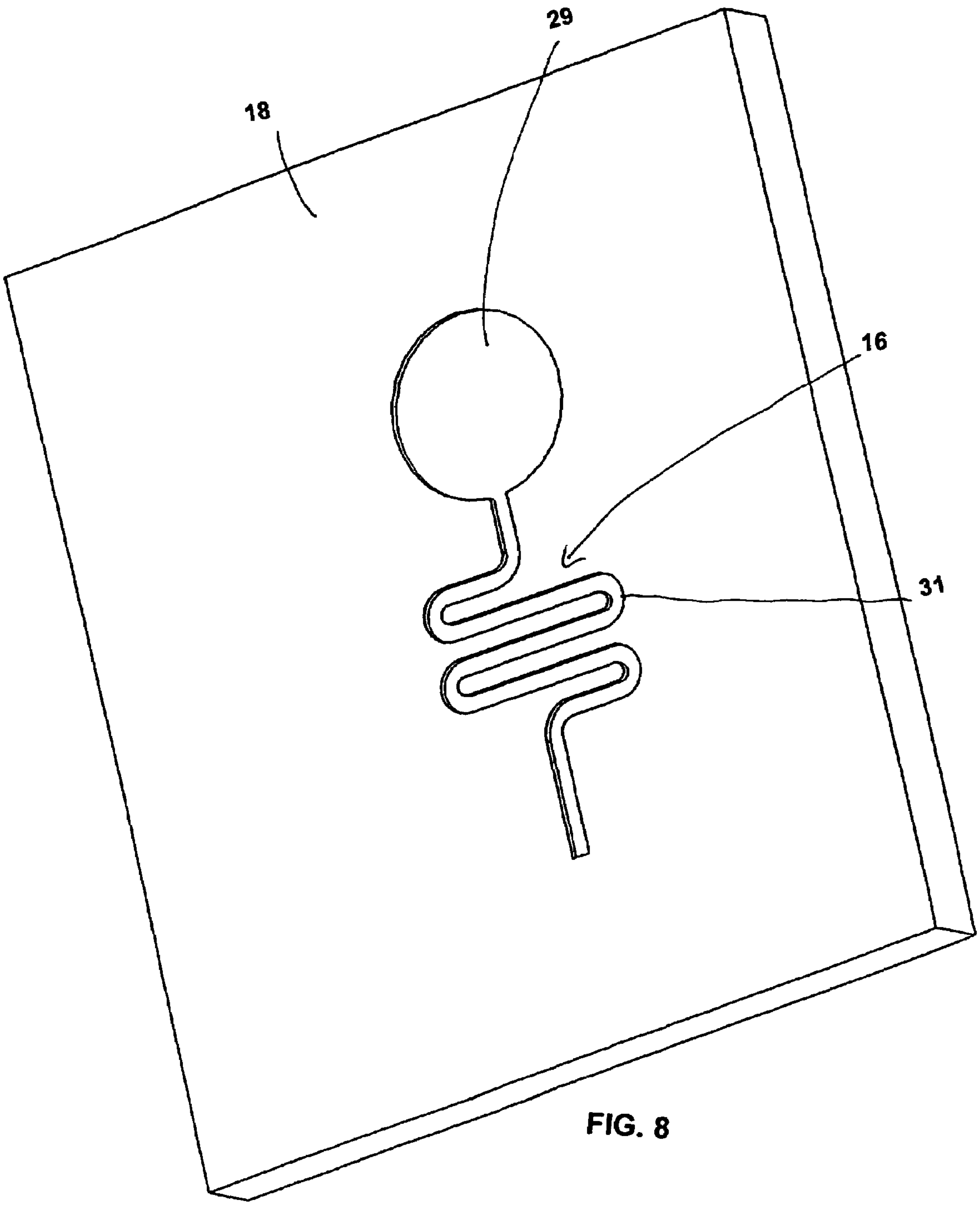
FIG. 8 is a perspective vie of another alternate second layer of the electrospray emitter as viewed from the inside of the layer and showing a smaller reservoir with a serpentine channel.
Figure 9:
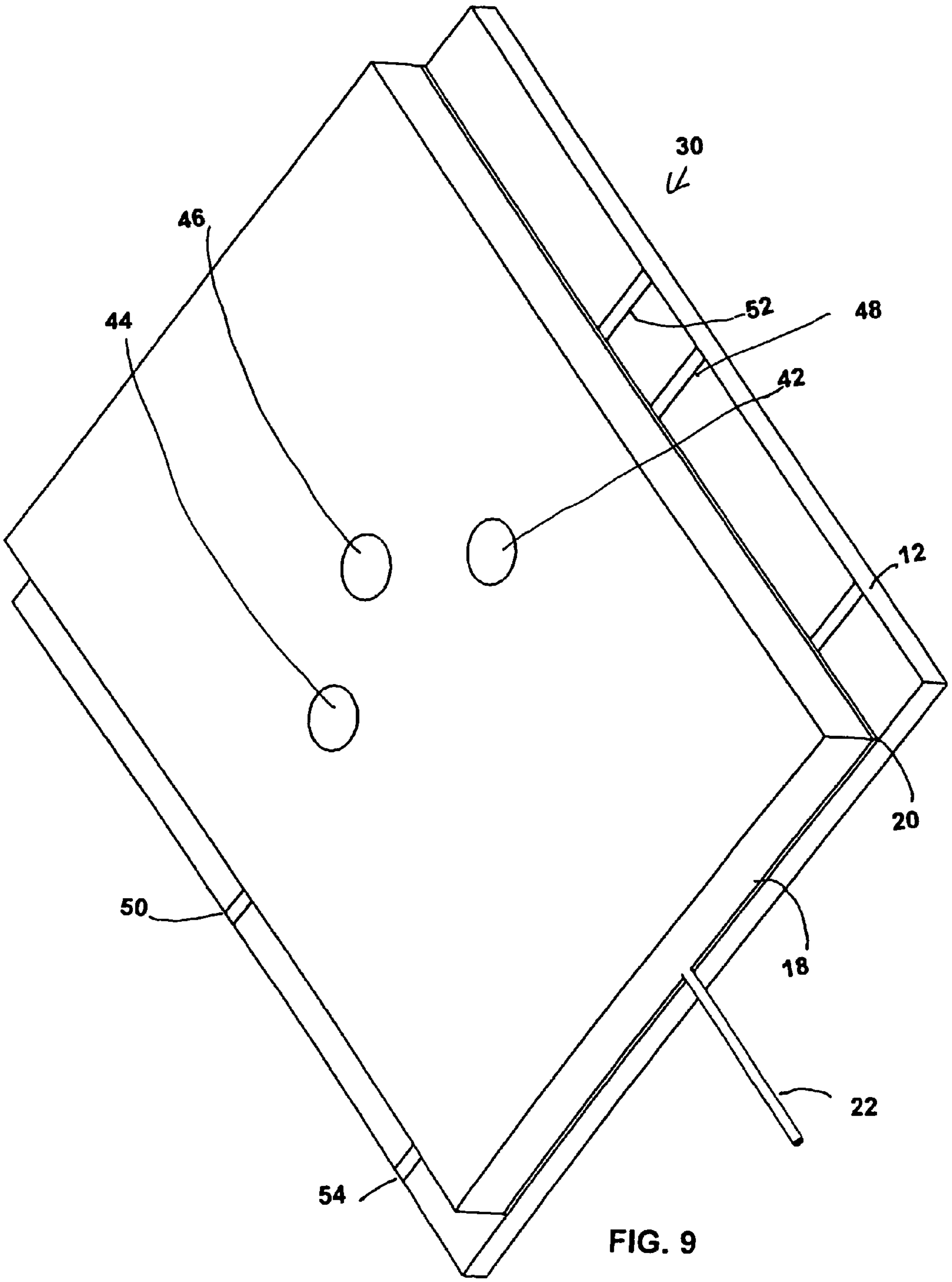
FIG. 9 is a perspective view of an alternate embodiment of the electrospray emitter constructed in accordance with the present invention.
Figure 10:
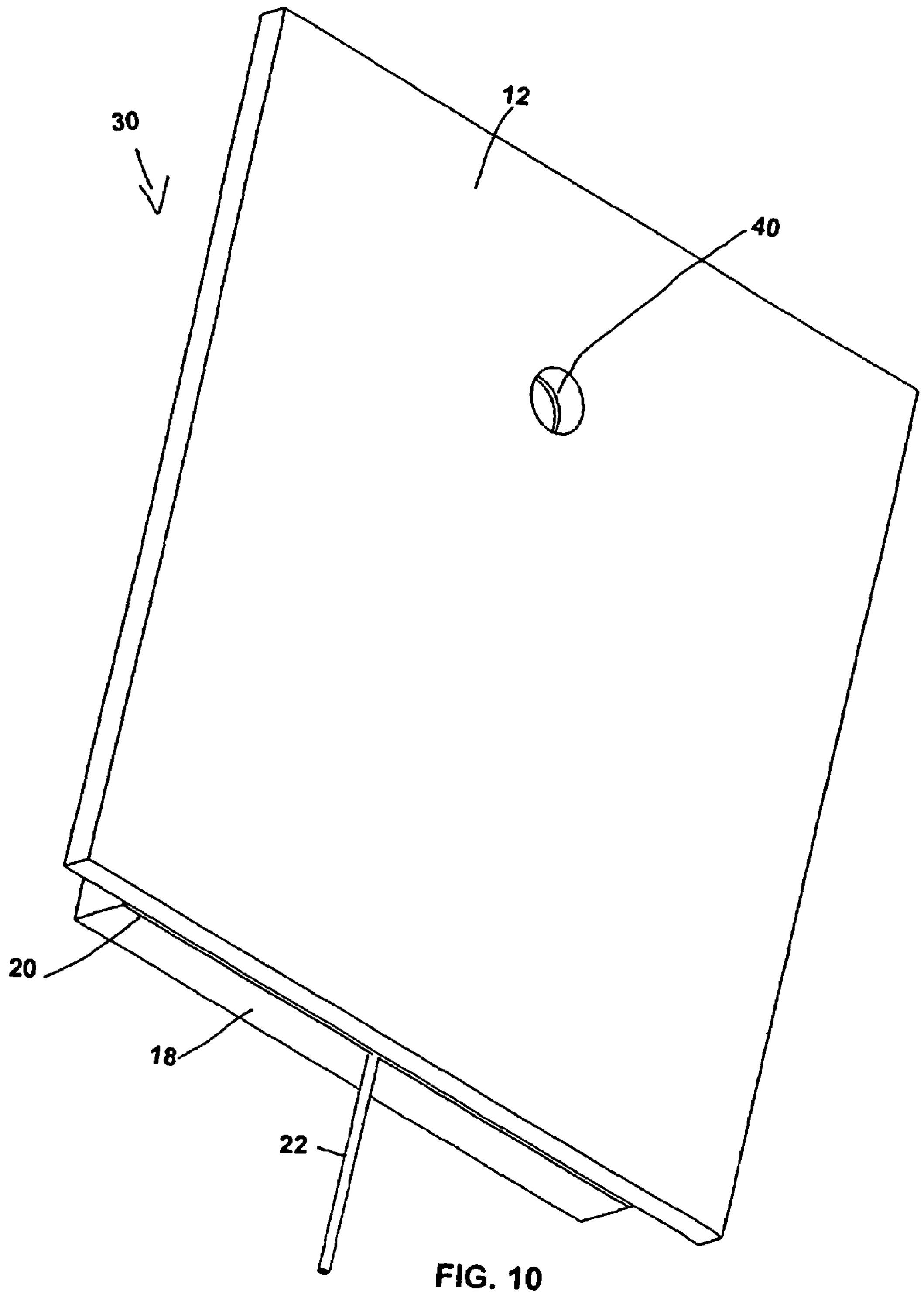
FIG. 10 is a perspective view of the electrospray emitter of FIG. 9 as seen from the other side.
Figure 11:
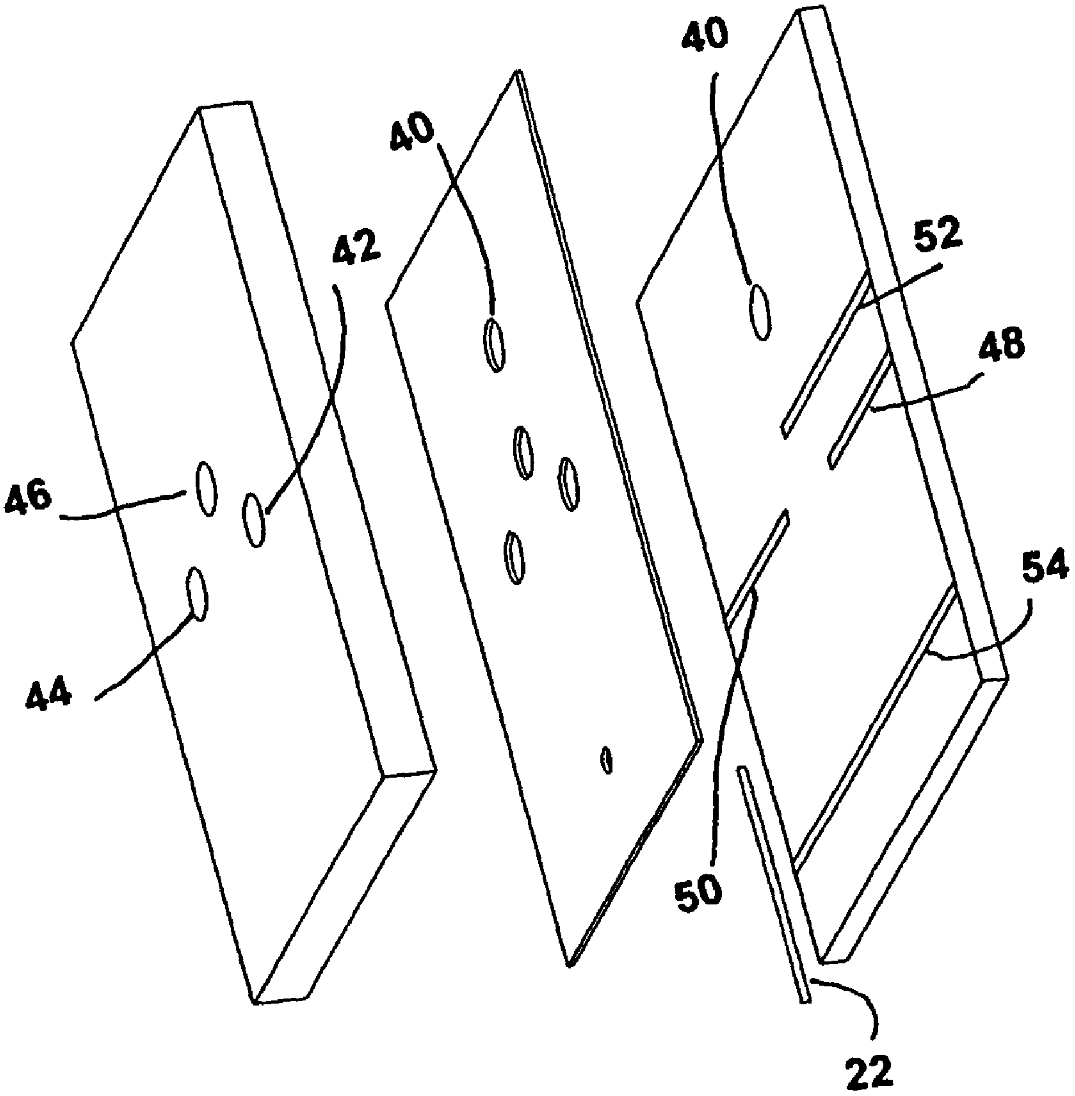
FIG. 11 is a blown apart perspective view of the electrospray emitter of FIG. 9.
Figure 12:
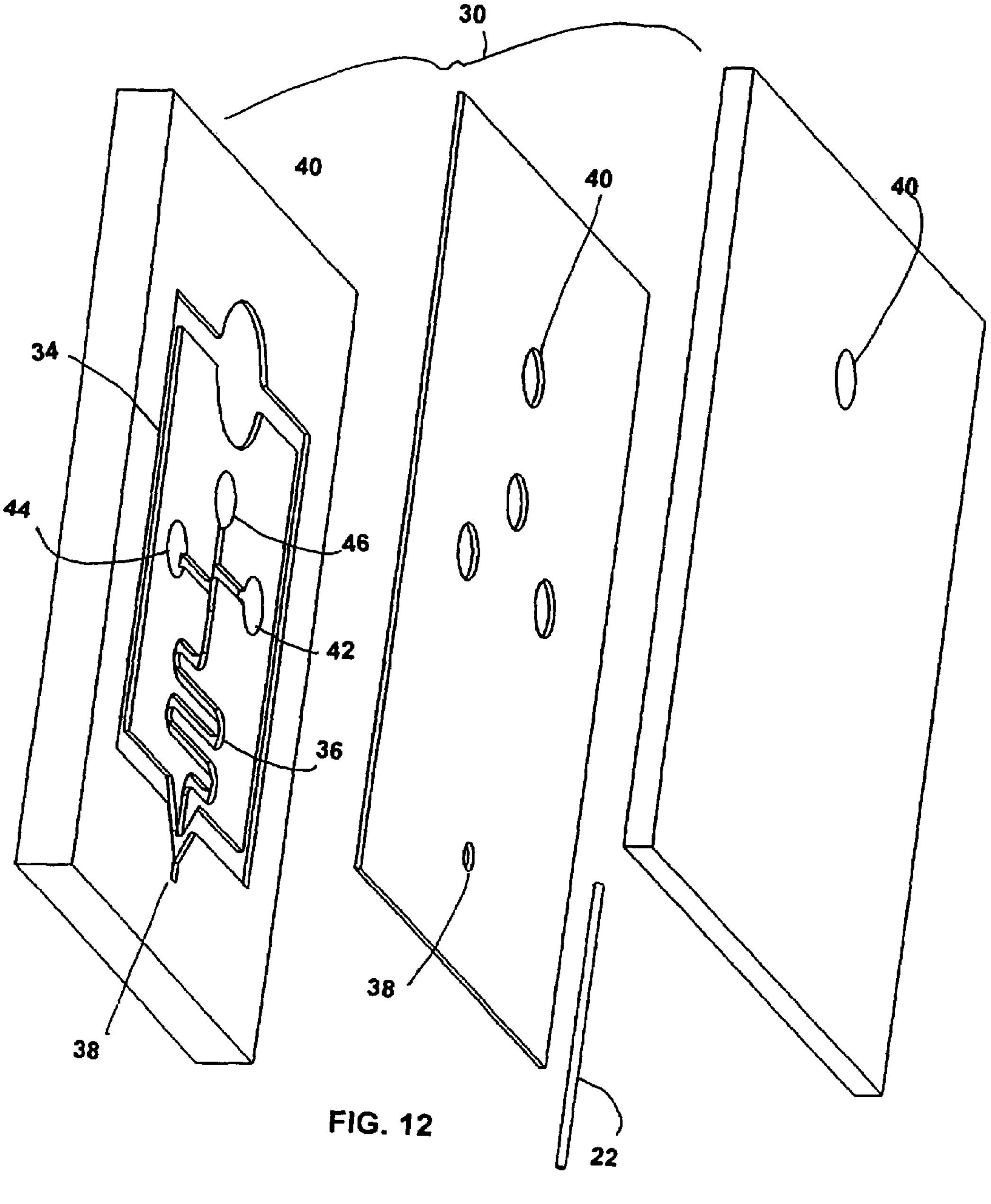
FIG. 12 is a blown apart perspective view of the electrospray emitter of FIG. 9 similar to that shown in FIG. 11 but as seen from the other side.
Figure 13:
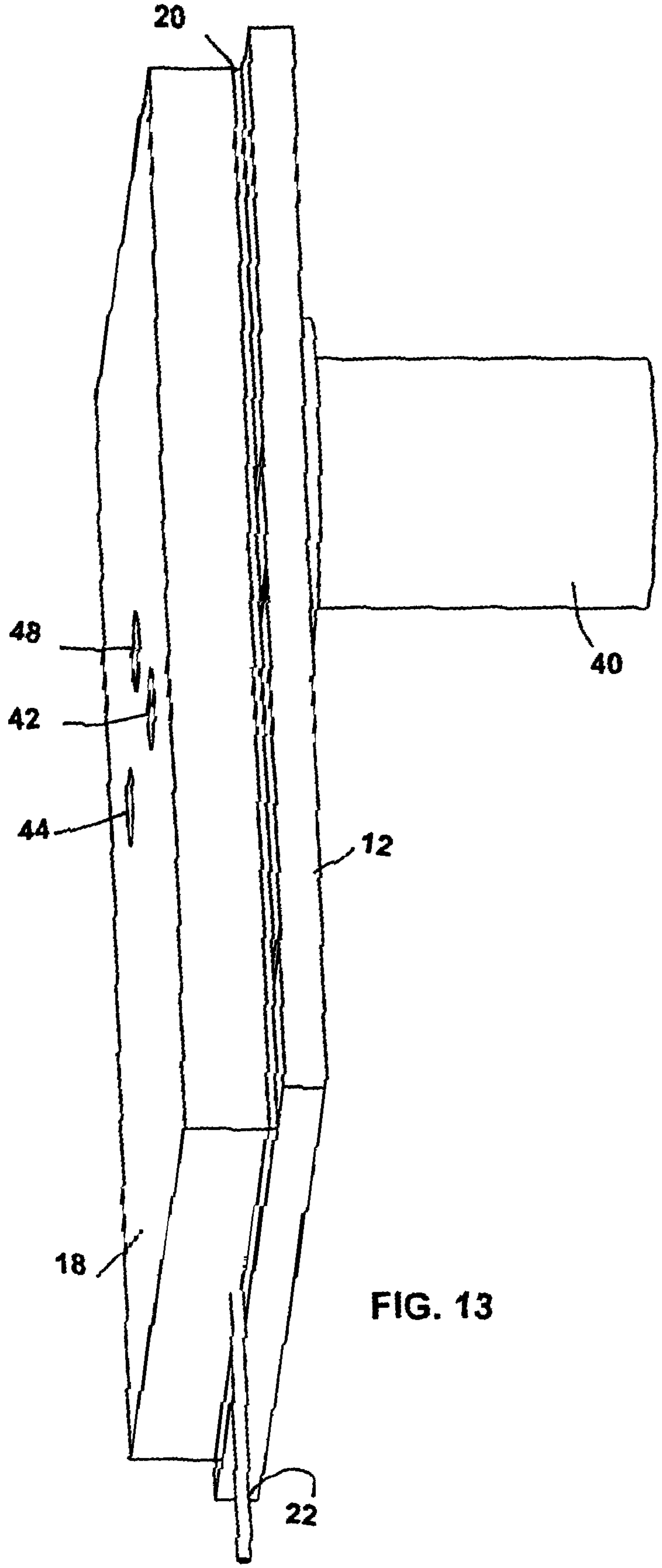
FIG. 13 is a perspective view of an electrospray emitter similar to that shown in FIG. 9 to 11 but including a Nanoport™.
Figure 14:
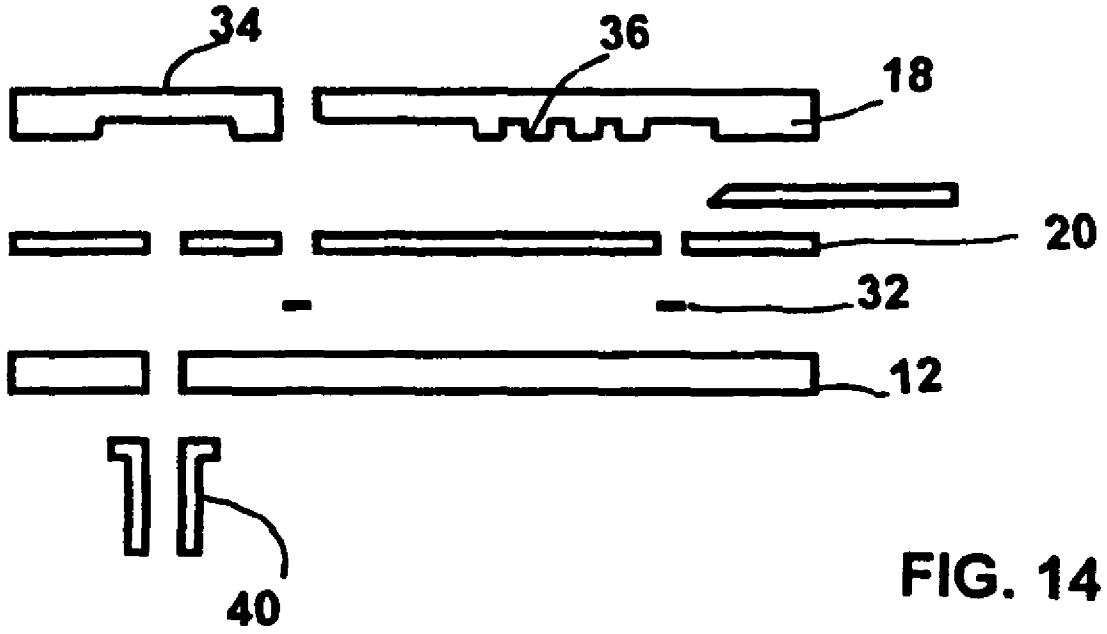
FIG. 14 is a blown apart cross sectional view of the electrospray emitter of FIG. 13.

The channel 16 may have a variety of different configurations depending on the intended use of the electrospray emitter. For example, the channel may be a simple reservoir 24 formed in the top layer 18 as shown in FIG. 6; a reservoir 26 with a straight channel 28 extending therefrom all formed in the top layer 18 as shown in FIG. 7; or a reservoir 29 with a serpentine channel 31 extending therefrom formed in the top layer 18 as shown in FIG. 8. The channel 16 (also referred to as the microfluidic channel 16) can be used for upstream processing of the fluid undergoing electrospray. One such process that can be incorporated is capillary electrophoresis (CE), and the geometry of the channel layer can be modified to fit the needs of the upstream process.

The fabrication procedure starts by cutting the glass substrate layer 12 to the appropriate size and then drilling a 2 millimeter fluid inlet 23 for fluidic access. The rigid glass substrate layer 12 is then cleaned in a hot Piranha (3:1 $H_2SO_4$:$H_2O_2$) solution for 10 minutes. A metal layer can be incorporated on top of the glass layer and used for upstream processing (i.e. CE) of the sample. Metal (chromium and/or gold) can be evaporated to a thickness of 400 nm and patterned to the desired shape.

The internal geometry of the PDMS emitter is formed by making a negative relief of the reservoir and channel network. The negative relief is made of patterned SU8™ by MicroChem. Corp. on a silicon wafer substrate. First, the silicon wafer is cleaned in a hot Piranha (3:1 $H_2SO_4$:$H_2O_2$) solution for 10 minutes and then in a dilute hydrofluoric acid solution (10:1 HF) for 5 minutes. SU8 2100™ is spun on to the wafer to create a thickness of 140 μm, however spin speeds can be controlled to create a range of thicknesses. The wafer is baked for 5 mins at 65° C. and 35 mins at 90° C. and then exposed to UV light using a mask aligner (Karl Suss) to transfer the desired pattern. The wafer is again baked for 15 mins at 90° C. and developed in SU8™ developer leaving only the desired pattern. This pattern will be used to form the channel network in the PDMS. The emitter in this design uses a reservoir that is 5 mm in diameter and a winding channel network with channel widths of 300 μm. The height of the channel is 140 μm.

PDMS is prepared by mixing the polymer solution with the curing agent in a ratio of 10:1. The mixed PDMS is then poured over the SU8™ relief structure and silicon wafer that is stored in a Petri dish (this will be the channel layer) and into a flat Petri dish containing no wafer (this will be the intermediate layer). The mixed solution is then placed in a vacuum chamber for 30 mins to remove any air bubbles trapped in the mixture. The PDMS filled dishes are then transfer to a convection oven at 80° C. for 2.5 hours. The thickness of the PDMS layers can be controlled by carefully measuring the dispensed mass of the polymer solution and curing agent. The emitter in this study has a channel layer that is ~1 mm thick and an intermediate layer that is ~200 μm thick. The intermediate layer can have holes punched in it for access to the metal layer on the surface of the glass wafer.

After curing, the PDMS layers are peeled off the silicon wafer/SU8™ relief structure and the flat Petri dish. The relief structure has now been formed in the channel layer of the PDMS. The three layers are bonded together by exposing the bonding surfaces to an oxygen plasma at 65 mT and 70 W for 15 seconds using an RIE/ICP etcher. After plasma exposure, the intermediate layer is aligned with the glass substrate and the two surfaces are contacted—forming a spontaneous bond. A hole is punched in the intermediate layer over the drilled hole. After again exposing the surfaces, the channel layer is aligned and contacted with the intermediate layer, again forming a spontaneous bond. An enclosed channel network has now been formed. A cross sectional layout of the prototype emitter is shown in FIG. 2.

The metal tubing 22 is positioned such that there is flow communication between the metal tubing 22 and the channel 16. The tubing is where electrical connections are made and the electrospray is formed from its edge. In this embodiment, tubing with an internal diameter (ID) of 140 μm and an outer diameter (OD) of 300 μm is used. The metal tubing is aligned with the top of the intermediate layer and with the edge of the channel using a microscope. Preferably the metal tubing 22 has a sharp edge 25 than can easily penetrate PDMS. Using a mechanical stage, the emitter chip is slowly advanced until the metal tubing 22 contacts the edge of the channel 16. The correct positioning is again checked visually using a microscope.

The compliance of the PDMS ensures that the needle is held firmly in place and that no leakage occurs around the edge. In this context, compliance or compliant means a material that is not rigid, can deform, does not form cracks, and is malleable.

In this case, the metal tubing 22 can easily penetrate the top PDMS layer 18. It does not form cracks (it is soft)—again for the metal tubing. It is able to penetrate, for the metal tubing but once the tubing is in contact with the channel, the outside of the needle is held firmly by the surrounding PDMS—so the PDMS is 'hugging' the metal tubing. This is to prevent leakage. If the PDMS is too rigid, it will not 'hug' the tubing. However, to ensure a tight seal, the edge of the emitter is clamped overnight in the vicinity of the needle. At the low flow rates used in this study (on the order of ~1 μL/min), we have found no leakage to occur around the edge of the needle. The compliance of the PDMS also helps to reduce the formation of dead volumes that often occur for similar concepts at the end of a channel network.

The final step in the fabrication of the PDMS emitter is to evaporate a layer of parylene over the entire device. A parylene coater (Specialty Coating Systems) is used to coat the device—but most importantly the metal tubing—with a parylene layer 1-2 μm thick. Parylene is hydrophobic, and it ensures that the droplet/Taylor cone is well isolated at the edge of the metal tubing.

Fluid flow and pressure can be supplied to the emitter by a pump. One possible pump is a syringe pump, where the connection to the device is made using a Nanoport™ (Upchurch Scientific). This method is useful for characterizing the performance of the emitter and evaluating the interfacial behaviour. Another possible pump is using mechanical pressure supplied by a clamp whose separation can be accurately controlled. In this approach, a hole is not drilled in the glass layer. The sample to be electrosprayed is injected into the reservoir chamber using a small gauge needle. The compliance of the PDMS tends to seal the hole after the needle is removed, preventing leakage (the hole can also be covered with epoxy). Pressure from the clamp deflects the PDMS over the reservoir and forces the fluid into the channel network and towards the end of the metal tube. Using this source of pressure, a stable electrospray can be formed for a short duration of time.

One advantages of this embodiment of the electrospray emitter of the present invention it that it is compatible and easily integrated with other microfluidic components used in upstream processing, it is uncomplicated to fabricate, it has limited dead volumes, and, since it is a closed system, it is not susceptible to solvent evaporation and channel contamination.

In another embodiment of the present invention, the electrospray emitter is used for capillary electrophoresis. An example of such an electrospray emitter is shown generally at 30 in FIGS. 9 to 13. As in the embodiment described above electrospray emitter 30 includes a top layer 18 and intermediate layer 20 and a rigid substrate. In addition electrospray emitter 30 has a metal layer 32. Metal layer 32 is etched to form electrodes.

Electrospray emitter 30 has an outer or first channel 34 and an inner or second channel 36. Outer channel 34 and inner channel 36 are in flow communication and merge proximate to outlet 38. Outer channel 34 includes an outer fluid inlet or Nanoport 40. Inner channel 36 has a serpentine configuration and has three ports 42, 44 and 46 respectively. Port 42, 44 and 46 each have a separately controllable electrode 48, 50, and 52 respectively operably connected thereto. An exit electrode 54 is operably connected to the metal tubing 22.

In use voltages are applied at the ports 42, 44 and 46 and outlet 38. Pressure driven flow is supplied into the outer channel 34 through the Nanoport at the fluid inlet 40. This fluid (buffer solution) travels through the outer channel 34 network connected to the fluid inlet port 40 and is the supporting sheath flow. The second channel network or inner channel 36 bounded by the ports 42, 44 and 46 and outlet 38 is where capillary electrophoresis takes place under the action of the applied voltages. The separated sample (using CE) and the sheath flow merge near outlet 38. The flow proceeds to the outlet 38 and then into the metal tubing 22 for electrospray.

In the first step of capillary electrophoresis, port 42 is where the sample of interest in a buffer solution is loaded. This sample will be undergoing CE and electrospray. Port 44 is a waste port. A voltage on the order of 1000 V is applied to loading port 42 and ground potential (0 V) is applied to waste port 44. Port 46 and outlet 38 have no applied voltage. The sample will migrate under the influence of the electric field and will fill the portion of the channel network 36 between loading port 42 and waste port 44. This step will run for several seconds.

In the second step of capillary electrophoresis, the voltage is removed from port 42 and port 44. A voltage on the order of 1000 to 5000 volts is supplied to port 46 and ground (0 V) potential is applied to outlet 38. A 'plug' of sample will be injected into the separation channel. Under the influence of the electric field, the sample will be fractionated. The sample migrates to the ground potential at outlet 38 where it is merged with the sheath flow and carried to the outlet 38 for electrospray. During this process, the sheath flow can be run continuously.

For the purpose of fractionation using a stationary solid phase, a slurry of microbeads is forced—using pressure driven flow—into the straight channel or winding channel (non-CE) configuration. The channel is made narrow at the end of the network so that the microbeads remain trapped inside the channel. The width of the narrow section should be just smaller than the size of the microbeads. This step is the last fabrication step for the SPE configuration.

Once the channel is loaded with microbeads, the sample of interest can be driven through the channel network using pressure driven flow towards the metal tubing for electrospray.

The following are ranges of operational parameters as determined from an equilibrium model of an electrified interface. The range of surface tension coefficients for buffer solutions are 22.5 mN/m to 72.0 mN/m. The range of metal tubing radius is from 25 microns to 150 microns. The range of pressures at the interface for the onset of electrospray is from nearly 0 Pa to 2880 Pa (relative to atmospheric) and in cone-jet mode. The range of pressure at the interface for maintaining electrospray is from −8423 Pa to 1000 Pa (relative to atmospheric) and in cone-jet mode. The range of separation distances is from 2 millimeters to 15 millimeters. The range of applied voltages is from 1000 volts to 3000 volts (if possible, 0 volts to 3000 volts should be claimed).

Figure 15:
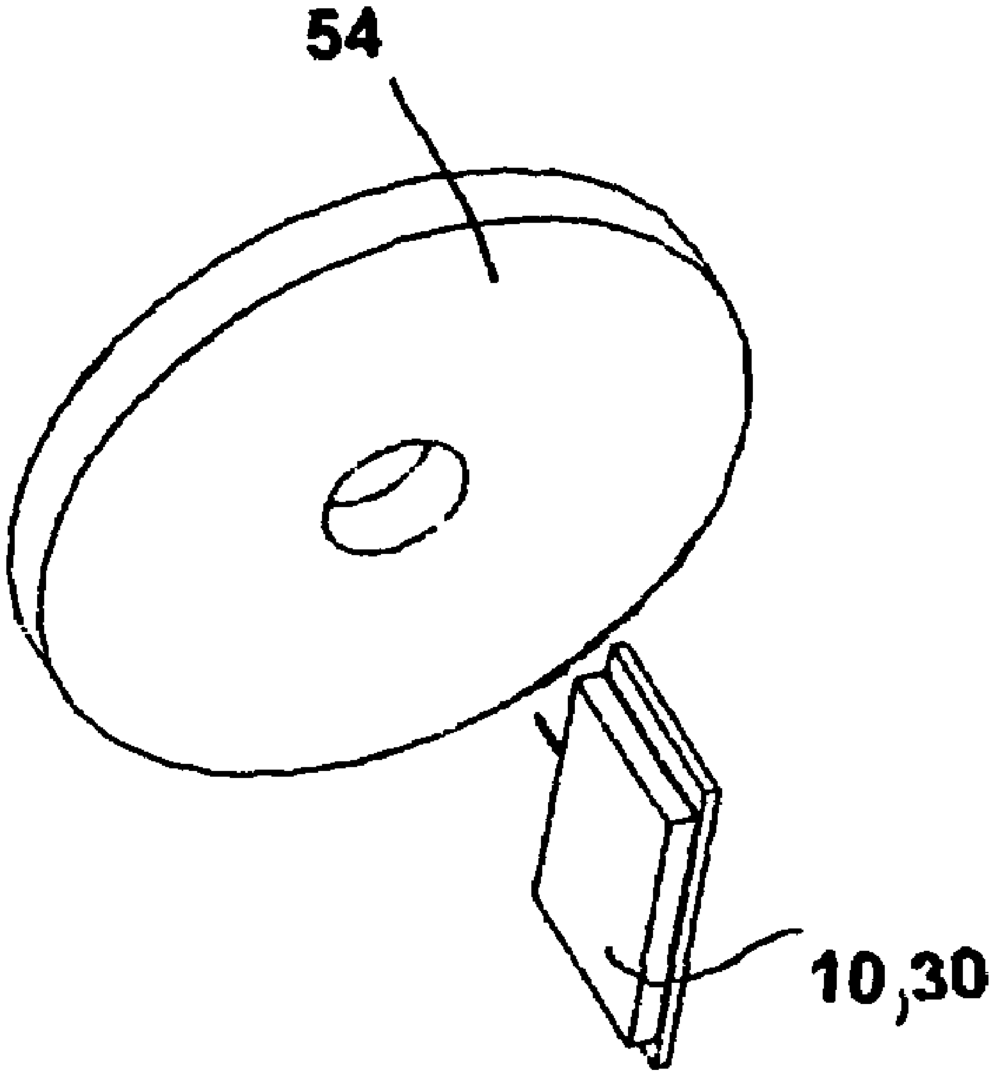
FIG. 15 is a perspective view of the electrospray emitter of the present invention in use with one of a mass spectrometer or an extractor electrode of a colloidal thrusters.
Figure 16:
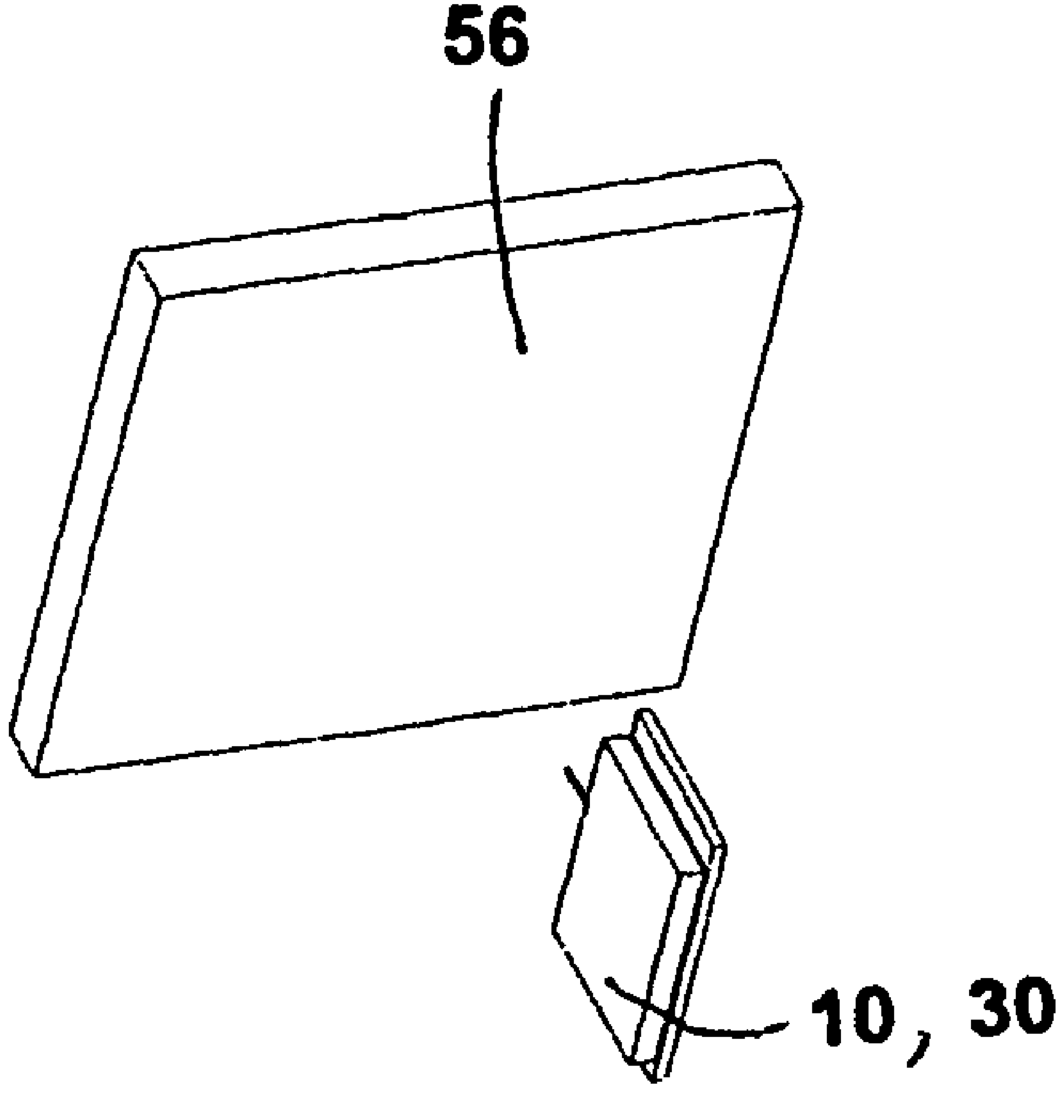
FIG. 16 is a perspective view of the electrospray emitter of the present invention shown with a surface to be coated.

The microscale electrospray emitter 10, 30 of the present invention may be used with a variety of different devices. For example it may be used with a mass spectrometer or an extractor electrode of a colloidal thrusters 54 as shown in FIG. 15. Alternatively the microscale electrospray emitter 10, 30 may be used to coat a surface 56 as shown in FIG. 16. As well the microscale electrospray emitter 30 may be used with a microscale ion mobility spectrometer 60.

In microscale ion mobility spectrometry (μIMS), ions are generated using the electrospray emitter and are injected into a drift chamber. The ions can be simple metal salts, peptides and proteins, or various toxins. The drift chamber is a straight enclosed channel with an electric field applied along its length. Under the influence of the electric field, the ions are transported along the channel towards a detector at the end of the channel. The detector is a metal electrode where the ions are neutralized and an electrical current is produced.

The ion's mobility along the drift chamber is a function of the ion electric charge, mass, and size. Therefore, different ions will be transported at different velocities and each individual ion type will have its own signature mobility. By knowing the mobility of an ion species, the identity of the ion can be determined by comparing the measured results with a pre-determined database of values. Mobility refers to the speed of the ions in a given electric field—and speed is determined by measuring the time between ion injection and response at the detector.

Referring to FIGS. 17 to 20, the ion mobility spectrometer 60 includes a first and a second spaced apart ion mobility substrate 62 and a pair of spacers 64 which define a drift chamber 66. The drift chamber 66 has an entrance 68 and an exit 70. Spectrometer 60 has a top metal layer 72 and a bottom metal layer 74 which define a gate electrode 76, a field electrode 78 and a detection electrode 80. The gate electrode is positioned at the entrance 68 of the drift chamber 66. The field electrode 78 is positioned in the drift chamber 66, downstream relative to the gate electrode 76. The detection electrode 80 is positioned in the drift chamber, downstream relative to both electrode 76 and electrode 78. Preferably the first and second spaced apart ion mobility substrates are made from glass and the spacers are made from PDMS.

The following are the steps used to fabricate the μIMS (as shown in FIGS. 17 to 20):

1. Two glass substrates 62 are prepared by cleaning in a Piranha solution.
2. Metal (chromium or chromium/gold) is deposited on the glass to a thickness of 200-500 nm.
3. The metal is etched and patterned to produce the gating electrode 76, field electrode(s) 78, and detector electrode 80. Identical patterns are made on both substrates 62. The metal patterns can take on a variety of different shapes.
4. Polydimethylsiloxane (PDMS) is prepared and cut into narrow lengths.
5. The PDMS sections are bonded to one of the glass substrates and are separated by several mm. Alignment is aided by coating the PDMS with methanol. This delays the bond and allows for movement of the PDMS layers. When the methanol evaporates the bond is formed.
6. The second glass substrate is bonded to the PDMS layer. The metal layers on both substrates are aligned under a microscope. A methanol coating is again used to delay the bonding.

The drift chamber 66 is formed in the enclosed space between the glass 62 and PDMS 64 sections. The height of the drift chamber is controlled by modifying the thickness of the spacers 64 or PDMS layer and the width of the drift chamber is controlled by modifying the spacing of the spacers 64 or PDMS sections. The height of the drift chamber 66 is a maximum of 5 mm and the maximum width of the drift chamber is 10 mm. The PDMS section width is between 3-5 mm, the glass substrate is 25×25 mm, and the electrode widths are between 0.5-5 mm.

Figure 17:
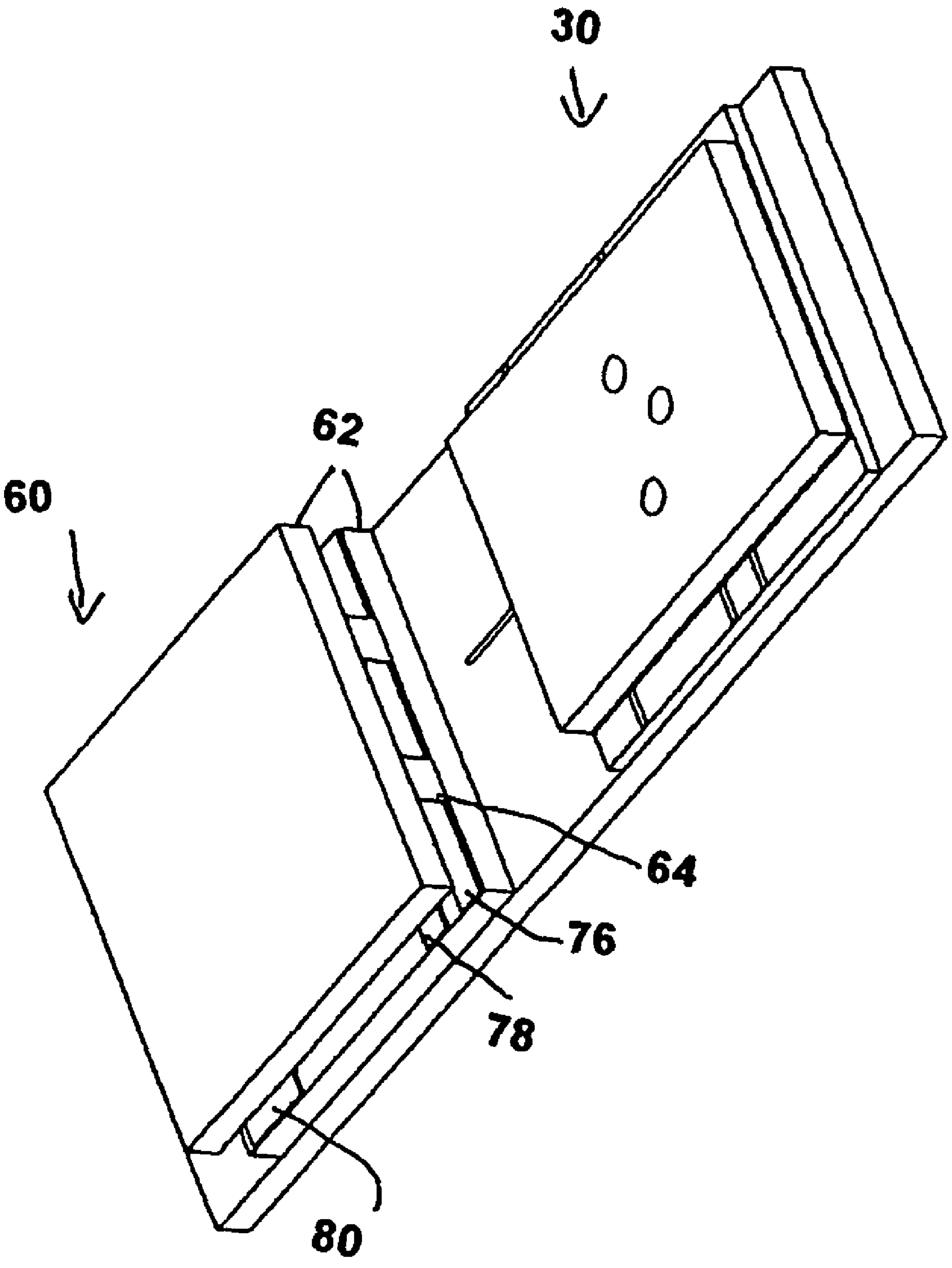
FIG. 17 is a perspective view of the electrospray emitter of the present invention shown with an ion mobility spectrometer.
Figure 18:
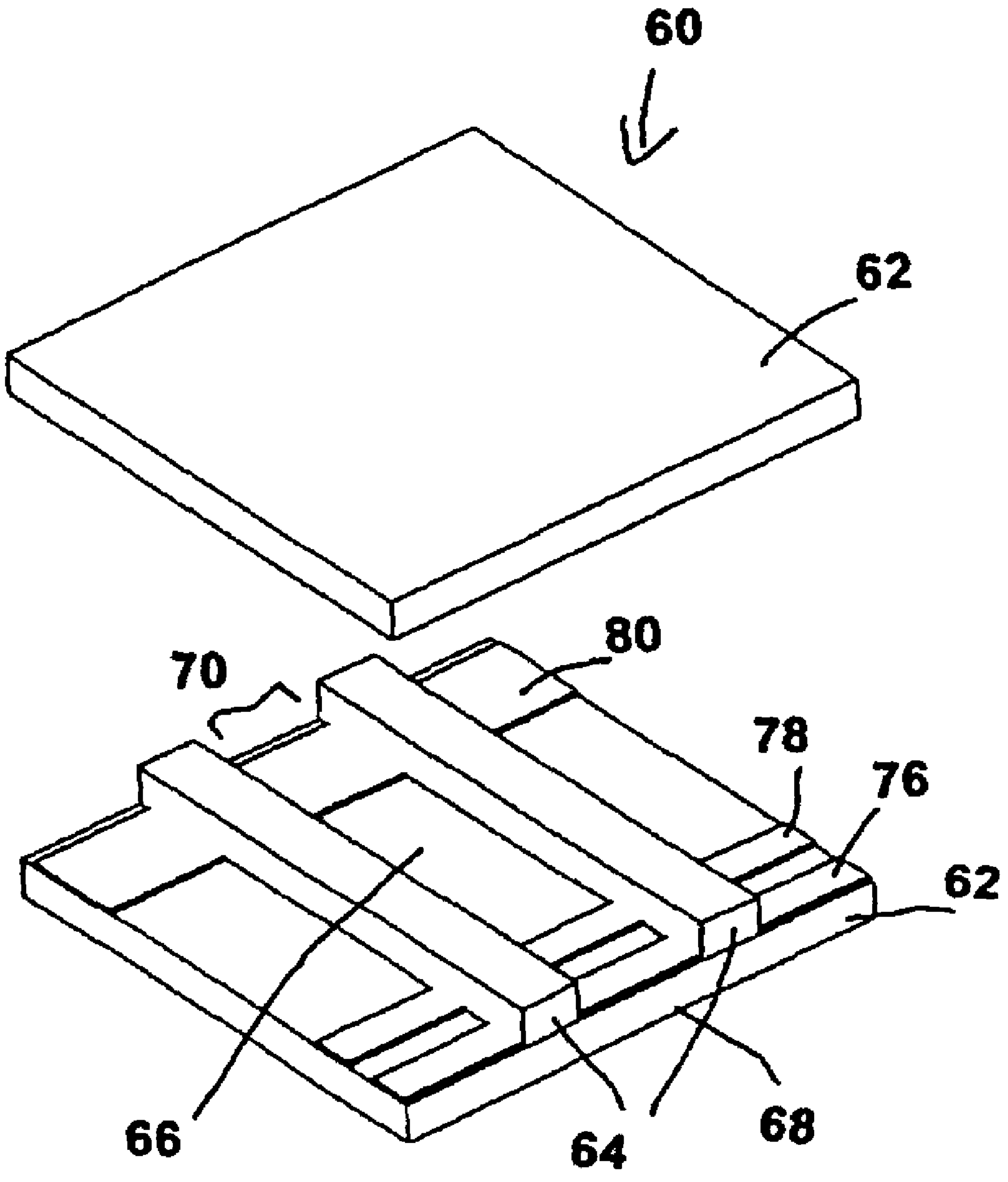
FIG. 18 is perspective view of the ion mobility spectrometer shown with the top substrate removed.
Figure 19:
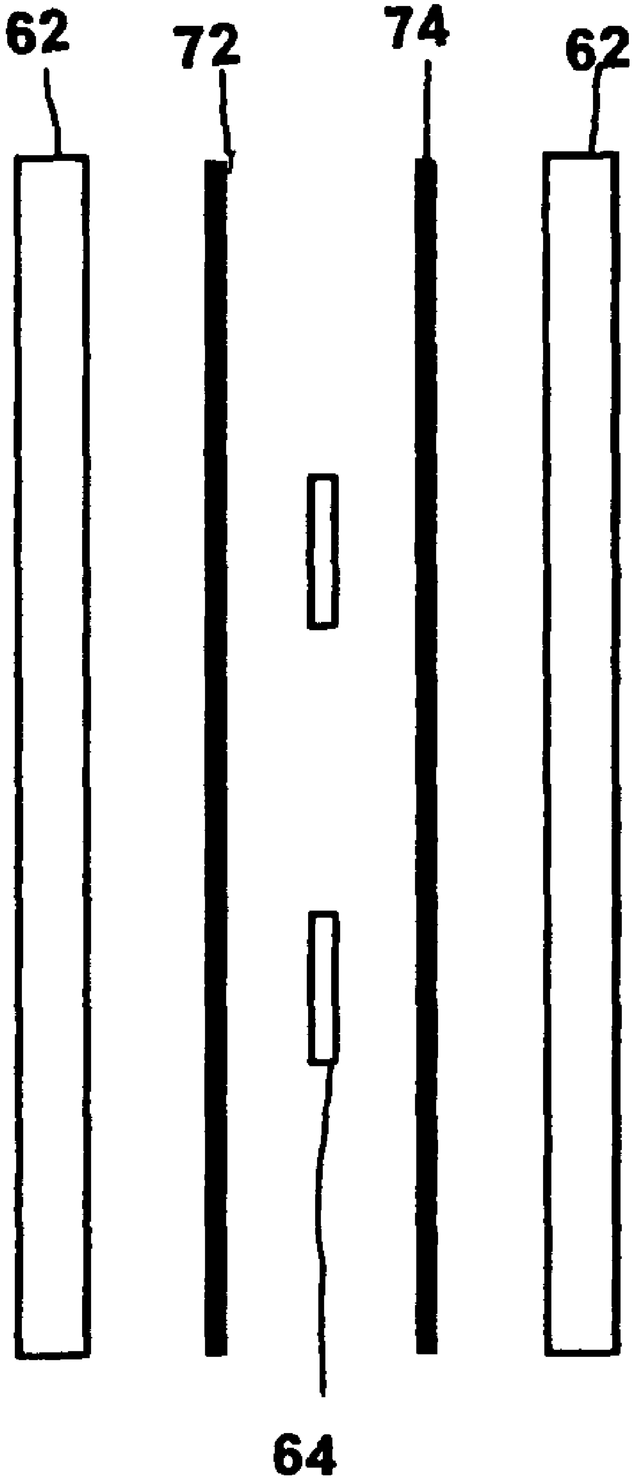
FIG. 19 is a blown apart cross sectional view of the ion mobility spectrometer.
Figure 20:
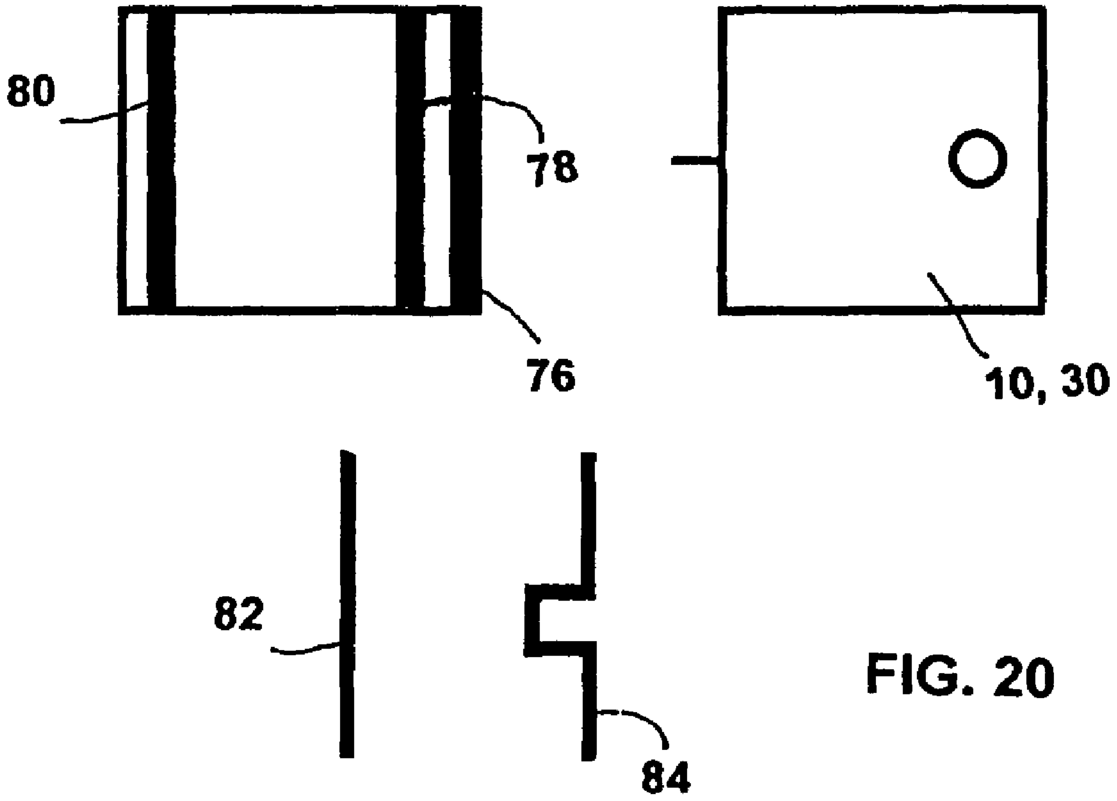
FIG. 20 is a schematic diagram of the electrospray emitter in use with the ion mobility spectrometer.
Figure 21:
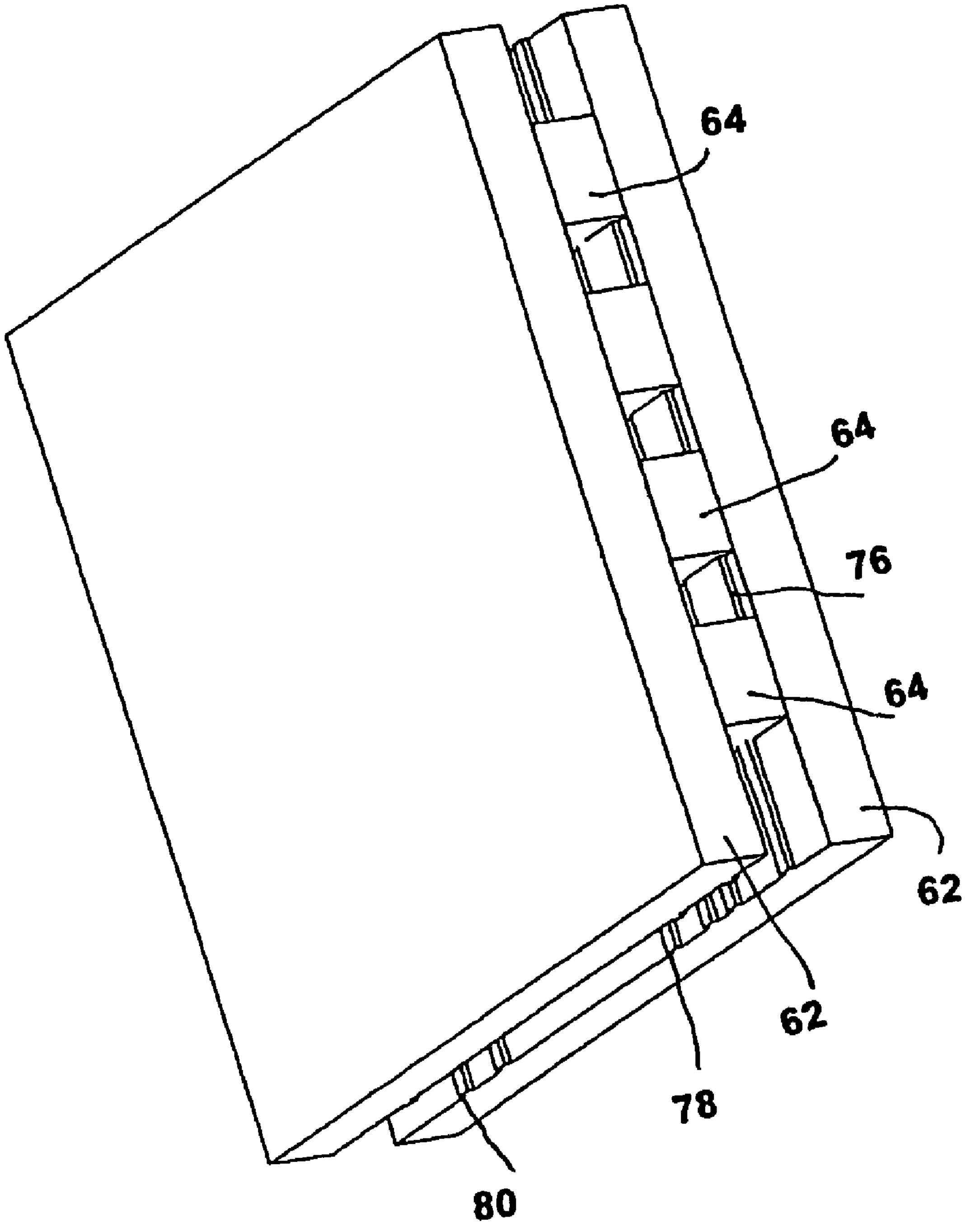
FIG. 21 is a perspective view of an alternate embodiment of the ion mobility spectrometer.
Figure 22:
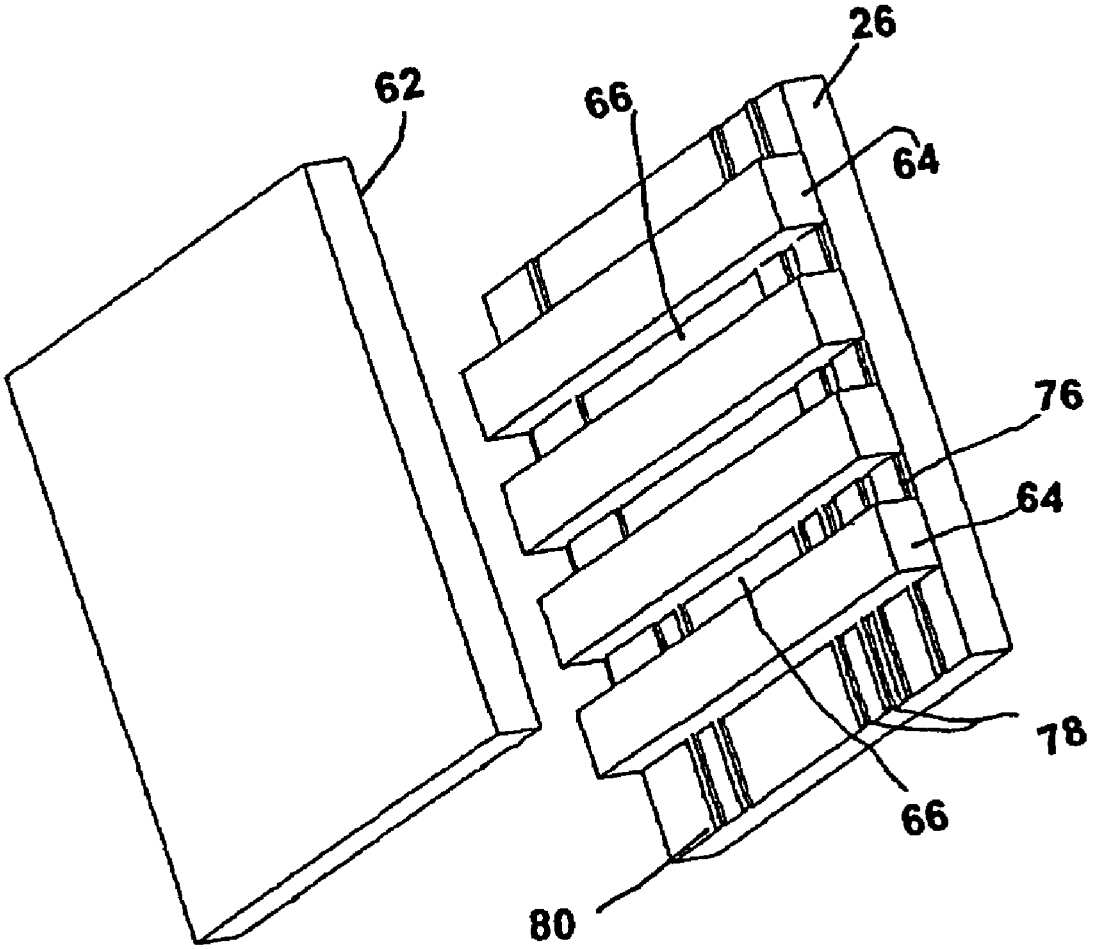
FIG. 22 is a perspective view of the ion mobility spectrometer of FIG. 21 but showing the top substrate removed.

Ions are produced using the electrospray emitter 10, 30 and they are injected into the drift chamber 66. Note that the μIMS in FIG. 17 is the most basic single channel concept. An exploded view of the μIMS is shown in FIG. 18. The electrode configuration is the most basic concept. The gate electrode 76 (closest to the emitter) is used to produce the Taylor cone (high potential is applied between the emitter 10,30 and the gate electrode 76). The gate electrode 76 is the 'counter electrode' referred to above. The detection electrode 80 is where ions are neutralized and the electrical current is measured. The field electrode 78 is in the middle of the device and is used to produce the electric field for the ion mobility measurement as shown in FIG. 17 (the field is applied between the field electrode 76 and detection electrode 80). In all designs, the shape of the gate electrode 76 and detection electrode 80 are unchanged. However, the field electrode(s) 78 can take on a variety of different patterns as shown in FIGS. 21 and 22.

The μIMS is highly scalable and multiple drift chambers can be incorporated on chip. As shown in FIGS. 21 and 22, additional spacers 64 or PDMS sections can be added to create additional drift chambers 66. This concept would require additional emitters, one for each drift chamber.

High potential is applied between the emitter 10, 30 and gate electrode 76. This field is used to produce a Taylor cone as described previously. An electric field (the IMS field) is also applied along the drift channel between the field electrode 78 and detection electrode 80 (otherwise known as the Faraday plate). The magnitude of the IMS field is between 100-500 V/cm. A commercially available current amplifier (Keithley) and oscilloscope (Agilent) measures the current (i.e. the ions) at the detection electrode.

The drift chamber 66 needs to be normally free of ions (i.e. ions need to be blocked from entering the drift chamber). When a measurement is to be performed, a packet or swarm of ions must be injected into the drift chamber using a gating technique. Note that the Taylor cone is normally operated in steady mode—continuously emitting a stream of ions. Therefore the voltage applied at the emitter, the field electrode(s), and detection electrode remains unchanged during device operation.

To block ions from entering the drift region 66, different potentials (referred to as 'high' and 'low') are applied to the upper 82 and lower 84 substrate gate electrode 76. The 'high' potential electrode is set to create the field necessary to produce a stable electrospray. The 'low' potential electrode is set to 0 V (ground). In this configuration, an asymmetry is created in the field and ions are blocked from entering the drift region. To inject an ion packet into the drift region, the 'low' potential electrode is set to be exactly equal to the 'high' potential electrode. This creates symmetry in the electric field and ions are allowed to enter the drift region and migrate to the detection electrode under the influence of the IMS field. The 'low' potential electrode is then rapidly switched back to 0 V (ground). The entire switching operation lasts for 0.1-1 ms and the operation.

The drift time of an ion species is the time separation between the injection operation and the measurement of an ion current peak. Up to 50 ion injections and time measurements are made and averaged to remove noise in the signal. The drift velocity is then calculated using the drift length (the distance between the gate 76 electrode and the detector electrode 80). Reduced mobility coefficients—the standard technique for representing ion mobility—are determined using the ion velocity and IMS electric field. The measured reduced mobility values are compared to a database of values to determine the identity of the ions.

Figure 23:
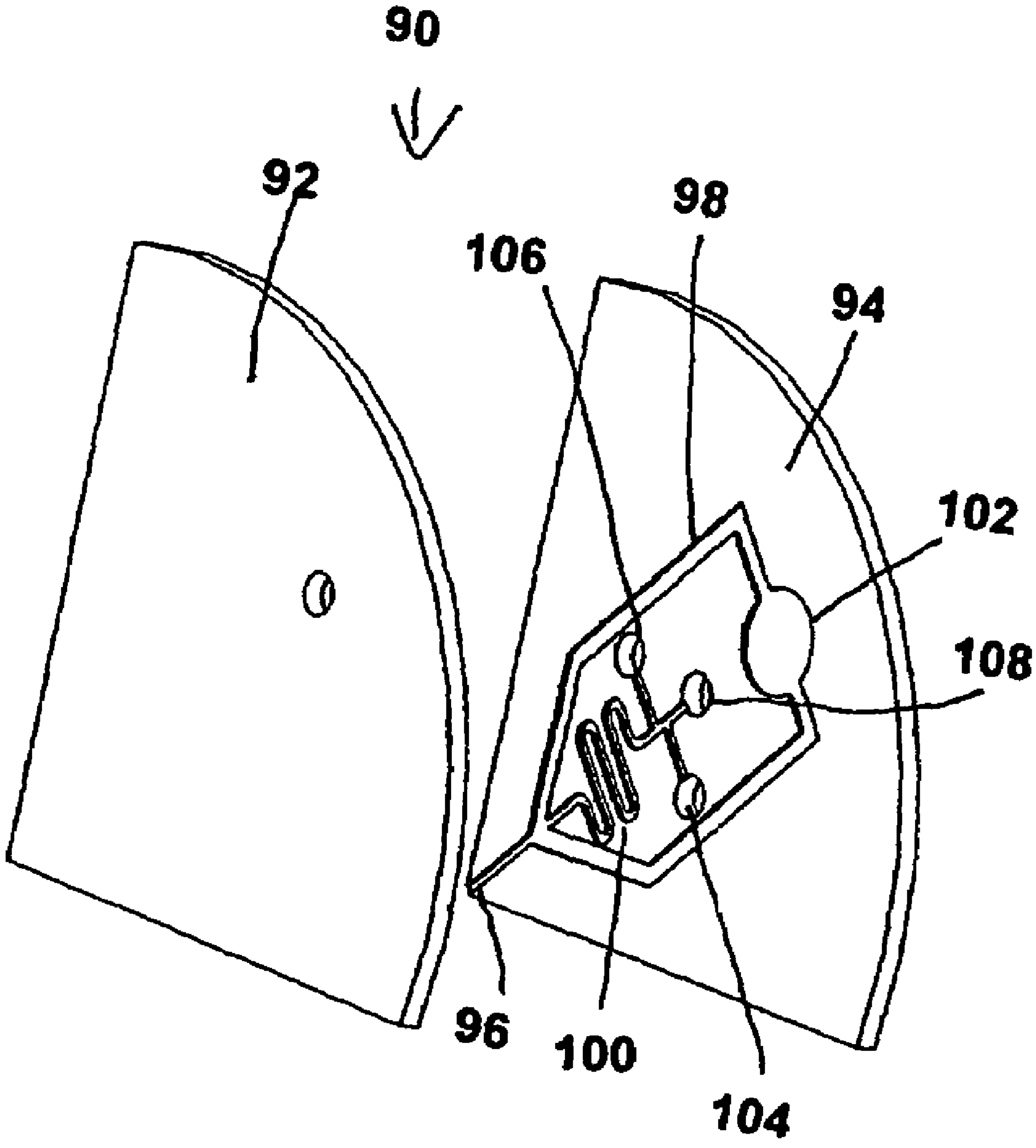
FIG. 23 is a blown apart perspective view of an electrospray emitter of the present invention and showing an integrated emitter orifice.
Figure 24:
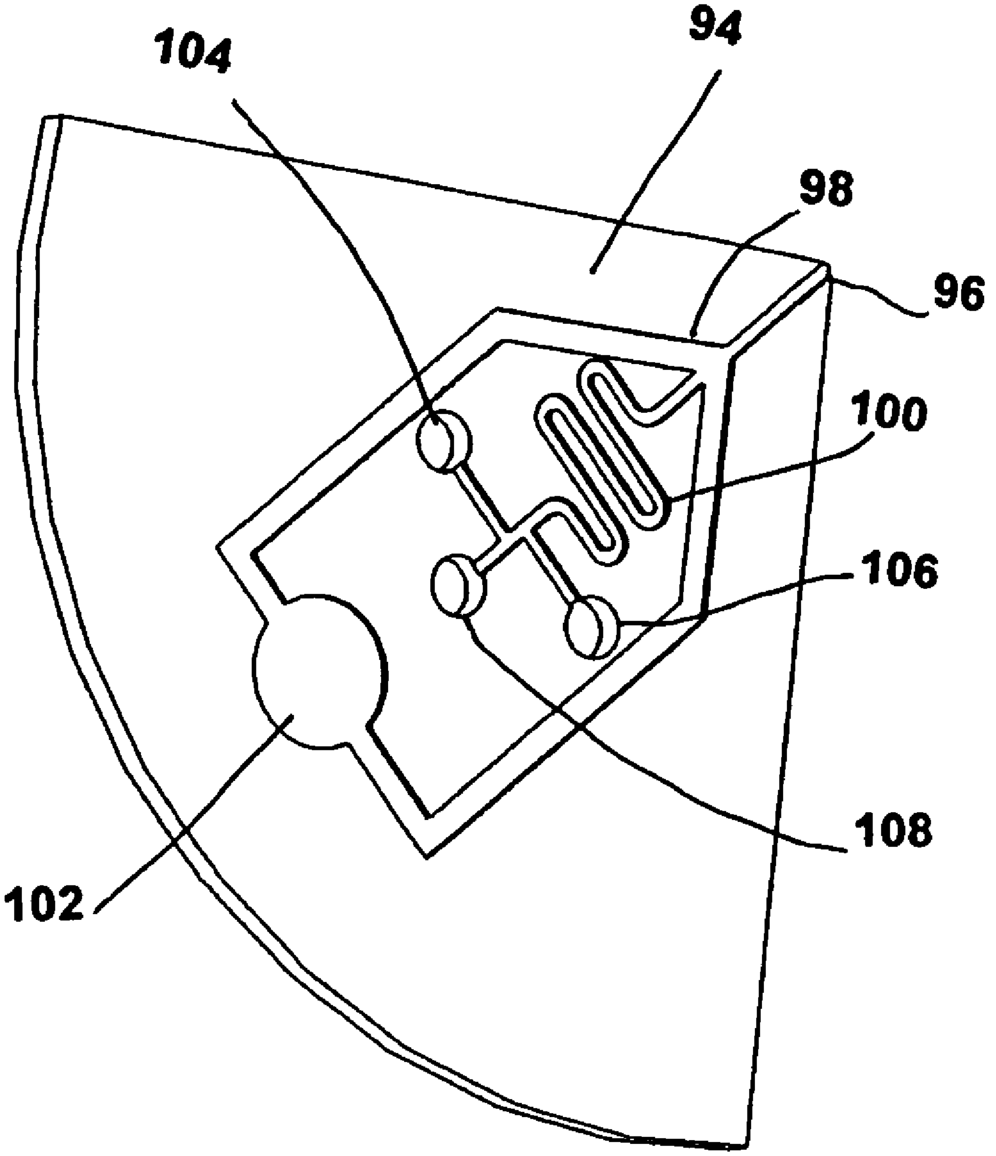
FIG. 24 is a perspective view of one layer (channel side) of the emitter of FIG. 23.
Figure 25:
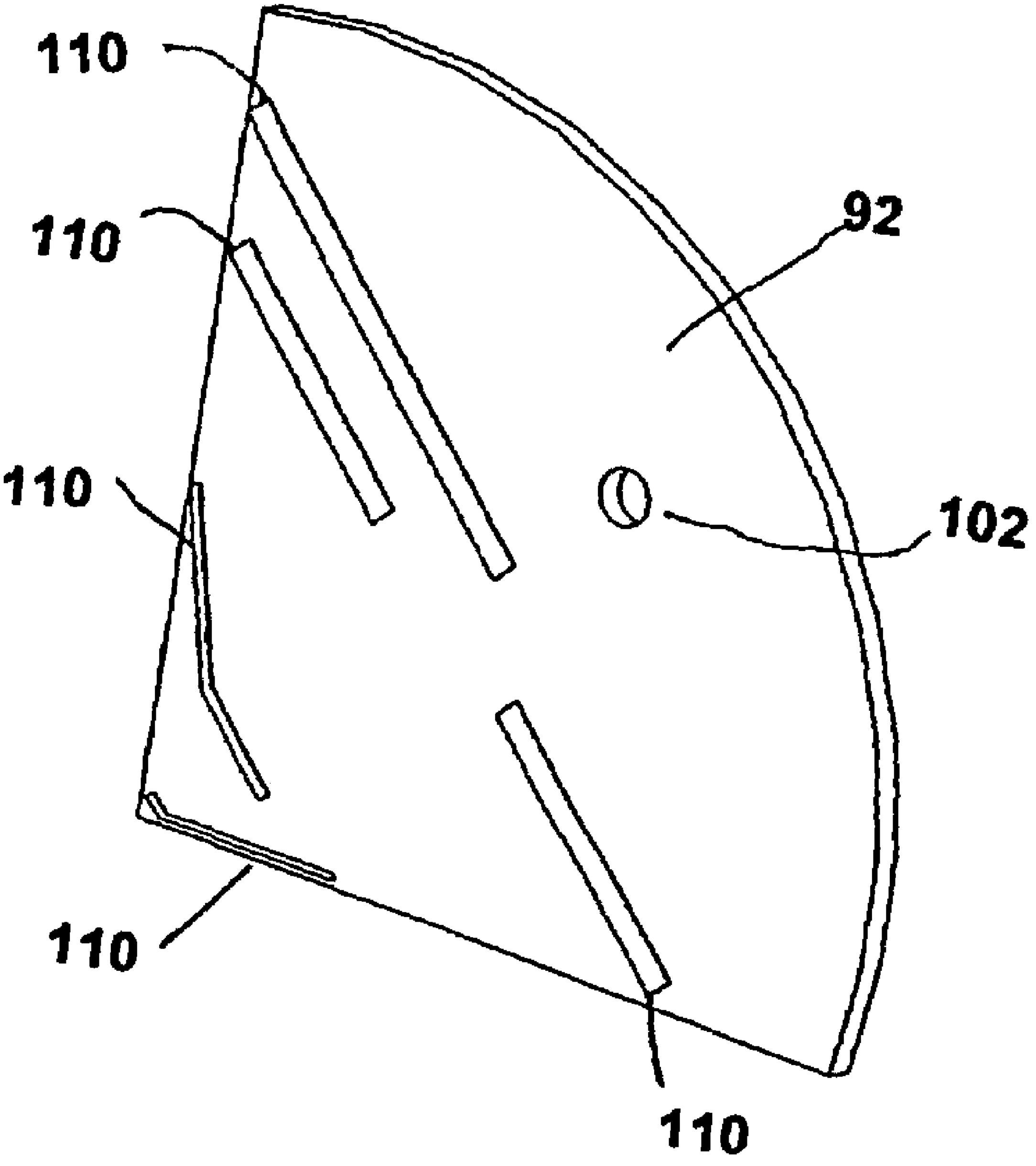
FIG. 25 is a perspective view of one layer (electrical layer side) of the emitter of FIGS. 23 and 24.

It will be appreciated by those skilled in the art that different materials and configurations may be used for the electrospray emitter. Referring to FIGS. 23 to 25, an emitter is shown generally at 90 and the rigid substrate layer 92 and the second layer 94 are both made from either glass or silicon. In this configuration an exit orifice 96 is integrally formed in the emitter 90 and there is no need for a separate metal tube 22 (as in FIGS. 1 to 5). Emitter 90 is similar to that shown in FIGS. 9 to 13. Specifically it includes an outer channel 98 and inner channel 100. An inlet port 102 is in flow communication with outer channel 98. Ports 104, 106 and 108 are in flow communication with inner channel 100. Electrodes 110 are operably connected to the 110 ports 104, 106, 108 and exit orifice 96. Exit orifice 96 is designed such that the exit orifice is capable of holding an electric charge and is capable of containing fluid within the perimeter of the orifice.

Generally speaking, the systems described herein are directed to electrospray emitters. As required, embodiments of the present invention are disclosed herein. However, the disclosed embodiments are merely exemplary, and it should be understood that the invention may be embodied in many various and alternative forms. The Figures are not to scale and some features may be exaggerated or minimized to show details of particular elements while related elements may have been eliminated to prevent obscuring novel aspects. Therefore, specific structural and functional details disclosed herein are not to be interpreted as limiting but merely as a basis for the claims and as a representative basis for teaching one skilled in the art to variously employ the present invention. For purposes of teaching and not limitation, the illustrated embodiments are directed to electrospray emitters.

As used herein, the terms "comprises" and "comprising" are to be construed as being inclusive and opened rather than exclusive. Specifically, when used in this specification including the claims, the terms "comprises" and "comprising" and variations thereof mean that the specified features, steps or components are included. The terms are not to be interpreted to exclude the presence of other features, steps or components.

What is claimed as the invention is:

1. An electrospray emitter comprising:
a rigid substrate layer;
a second layer attached to the rigid substrate;
a channel formed in at least one of the rigid substrate layer and the second layer;
an exit orifice in flow communication with the channel, the exit orifice being capable of holding an electric charge; and
an ion mobility spectrometer spaced from the exit orifice, the ion mobility spectrometer having a drift chamber, a gate electrode positioned at the entrance of the drift chamber; and a field electrode positioned in the drift chamber, downstream of the gate electrode.

2. The electrospray emitter as claimed in claim 1 wherein the exit orifice is capable of containing fluid within the perimeter of the orifice.

3. The electrospray emitter as claimed in claim 1 further including a means for applying pressure to the channel.

4. The electrospray emitter as claimed in claim 3 further including a fluid inlet in flow communication with the channel.

5. The electrospray emitter as claimed in claim 4 wherein the pressure means is a pump connected to the fluid inlet.

6. The electrospray emitter as claimed in claim 5 further including at least one reservoir in flow communication with the channel.

7. The electrospray emitter as claimed in claim 5 further including a plurality of reservoirs, each in flow communication with the channel.

8. The electrospray emitter as claimed in claim 6 further including a metal layer between the rigid substrate layer and the second layer.

9. The electrospray emitter as claimed in claim 6 wherein each reservoir has a diameter of up to 5 mm and the channel has a width of up to 300 μm.

10. The electrospray emitter as claimed in claim 8 wherein the metal layer is one of chromium, and a combination of chromium and gold.

11. The electrospray emitter as claimed in claim 8 wherein the metal layer is etched leaving two spaced apart metal electrodes.

12. The electrospray emitter as claimed in claim 11 further including a means for applying a voltage between the two spaced apart metal electrodes.

13. The electrospray emitter as claimed in claim 3 further including a means for applying a voltage between the exit orifice and the ion mobility spectrometer.

14. The electrospray emitter as claimed in claim 13 wherein the ion mobility spectrometer further comprises:

a first and a second spaced apart ion mobility substrate;

at least two spacers between the first and second ion mobility substrates whereby the first and second ion mobility substrates and two of the at least two spacers define a drift chamber having an entrance and an exit; and a detection electrode positioned in the drift chamber, downstream of the field electrode.

15. The electrospray emitter as claimed in claim 14 wherein first and second ion mobility substrate are each glass and each spacer is polydimethylsiloxane.

16. The electrospray emitter as claimed in claim 15 wherein the field electrode includes a plurality of field electrodes.

17. The electrospray emitter as claimed in claim 16 wherein there are a plurality of drift chambers defined by the first and second ion mobility substrates and a plurality of spaces.

18. The electrospray emitter as claimed in claim 17 wherein substrate layer of the electrospray emitter and the first ion mobility substrate of the ion mobility spectrometer are a common substrate.

19. The electrospray emitter as claimed in claim 1 wherein the second layer is a compliant polymer layer.

20. The electrospray emitter as claimed in claim 19 wherein the exit orifice is a metal tube insertable into the compliant polymer layer whereby the metal tube is in flow communication with the channel.

21. The electrospray emitter as claimed in claim 20 further including a syringe for injecting a fluid sample through the compliant layer into the channel.

22. The electrospray emitter as claimed in claim 21 wherein the metal tube is inserted after the fluid sample has been injected into the emitter.

23. The electrospray emitter as claimed in claim 22 wherein the metal tube has an inside diameter of up to 140 μm and an outside diameter of up to 300 μm.

24. The electrospray emitter as claimed in claim 20 wherein the metal tubing includes an outside layer of parylene.

25. The electrospray emitter as claimed in claim 24 wherein the parylene is between 1 and 2 μm thick.

26. The electrospray emitter as claimed in claim 19 wherein the compliant polymer layer is a compliant polydimethylsiloxane layer.

27. The electrospray emitter as claimed in claim 26 wherein the compliant polydimethylsiloxane layer includes an intermediate layer and a channel layer each of compliant polydimethylsiloxane attached to the rigid substrate, wherein the intermediate layer is substantially a planar layer, and the channel layer of compliant polydimethylsiloxane has open channels formed on a first side thereof and the first side is attached to the intermediate layer.

28. The electrospray emitter as claimed in claim 26 wherein the compliant polydimethylsiloxane layer is prepared by mixing a polymer solution with a curing agent in a ratio between 8:1 and 12:1.

29. The electrospray emitter as claimed in claim 28 wherein the ratio is 10:1.

30. The electrospray emitter as claimed in claim 19 wherein the rigid substrate is glass.

31. The electrospray emitter as claimed in claim 1 wherein the rigid substrate layer and the second layer are the same material selected from the group consisting of glass and silicon.

32. The electrospray emitter as claimed in claim 1 wherein the channel includes a first channel and a second channel and the first channel has an first channel inlet port and the second channel has at least one second channel inlet port and the first channel and the second channel are in flow communication and meet down stream of the exit orifice.

33. The electrospray emitter as claimed in claim 32 wherein the second channel is a serpentine channel and there are three second channel inlet ports.

34. The electrospray emitter as claimed in claim 33 further including plurality of electrodes operably connected to each second channel inlet port and to the exit orifice and each electrode is separately controllable.

35. An ion mobility spectrometer comprises:

a first and a second spaced apart ion mobility substrate;

at least two spacers between the first and second ion mobility substrates whereby the first and second ion mobility substrates and two of the at least two spacers define a drift chamber having an entrance and an exit;

a gate electrode positioned at the entrance of the drift chamber;

a field electrode positioned in the drift chamber, downstream of the gate field electrode; and a detection electrode positioned in the drift chamber, downstream of the field electrode.

36. The ion mobility spectrometer as claimed in claim 35 wherein first and second ion mobility substrate are each glass and each spacer is polydimethylsiloxane.

37. The ion mobility spectrometer as claimed in claim 36 wherein the field electrode includes a plurality of field electrodes.

38. A method of creating an electrospray using an electrospray emitter having a fluid channel, an exit orifice in flow communication with the fluid channel, a counter electrode spaced from the exit orifice and whereby the exit orifice is capable of holding and electric charge and the exit orifice is capable of containing fluid within the perimeter of the orifice, comprising the steps of:

applying a pressure to the exit orifice in a predetermined range;

applying a pressure and maintaining the pressure to the fluid channel in a predetermined range;

applying voltage in a predetermined range between the exit orifice and the counter electrode; and determining a separation distance between the exit orifice and the counter electrode in a predetermined range.

39. The method as claimed in claim 38 wherein the applied voltage across said plurality of electrodes is up to 3000 volts DC.

40. The method as claimed in claim 39 wherein the applied pressure to the exit orifice is up to 0.5 kPa relative to atmospheric pressure.

41. The method as claimed in claim 40 wherein the separation distance is between 5 and 15 mm.

42. The method as claimed in claim 41 wherein the counter electrode is an inlet to a mass spectrometer.

43. The method as claimed in claim 41 wherein the counter electrode is an object that is being coated.

44. The method as claimed in claim 41 wherein the counter electrode is a part of a colloidal thrusters system.

45. The method as claimed in claim 41 wherein the counter electrode is an ion mobility spectrometer.

46. The method as claimed in claim 38 wherein the fluid channel includes a first channel and a second channel and the first channel has an first channel inlet port and the second channel has three second channel inlet ports, the first channel and the second channel are in flow communication and meet down stream of the exit orifice and a plurality of electrodes are operably connected to each second channel inlet port and to the exit orifice and each electrode is separately controllable and further including the steps of:

inputting a buffer into the first channel inlet port;

inputting a sample to be tested into one of the three second channel inlet ports; and selectively energizing the plurality of electrodes.

* * * * *